United States Patent
Takano

(10) Patent No.: US 9,843,415 B2
(45) Date of Patent: *Dec. 12, 2017

(54) TERMINAL APPARATUS, FEEDBACK CONTROL METHOD, BASE STATION, PAIRING CONTROL METHOD, PROGRAM, AND WIRELESS COMMUNICATION SYSTEM

(71) Applicant: SONY CORPORATION, Tokyo (JP)

(72) Inventor: Hiroaki Takano, Saitama (JP)

(73) Assignee: SONY CORPORATION, Tokyo (JP)

(*) Notice: Subject to any disclaimer, the term of this patent is extended or adjusted under 35 U.S.C. 154(b) by 91 days.

This patent is subject to a terminal disclaimer.

(21) Appl. No.: 15/079,877

(22) Filed: Mar. 24, 2016

(65) Prior Publication Data

US 2016/0204903 A1    Jul. 14, 2016

Related U.S. Application Data

(63) Continuation of application No. 13/981,145, filed as application No. PCT/JP2012/051797 on Jan. 27, 2012, now Pat. No. 9,331,766.

(30) Foreign Application Priority Data

Feb. 10, 2011   (JP) .................... 2011-027655

(51) Int. Cl.
*H04W 52/24* (2009.01)
*H04W 52/26* (2009.01)
(Continued)

(52) U.S. Cl.
CPC ......... *H04L 1/0073* (2013.01); *H04B 7/0634* (2013.01); *H04B 17/318* (2015.01);
(Continued)

(58) Field of Classification Search
CPC .. H01Q 3/2605; H01Q 3/2682; H04B 7/0408; H04B 7/0413; H04B 7/0689;
(Continued)

(56) References Cited

U.S. PATENT DOCUMENTS 8,064,502 B2 * 11/2011 Sawai ............... H04L 25/03006
375/219
8,818,447 B2 * 8/2014 Yamazaki ............ H04B 7/0417
375/260

FOREIGN PATENT DOCUMENTS

WO    WO 2009/084921 A2    7/2009
WO    WO 2010/006845 A2    1/2010
WO    WO 2010/137666 A1    12/2010

OTHER PUBLICATIONS

"UE Feedback Extension for SU/MU-MIMO", Sony Corporation, 3GPP TSG RAN WG1 #60, R1-101019, Feb. 22-26, 2010, 6 pages.
(Continued)

*Primary Examiner* — Ayaz Sheikh
*Assistant Examiner* — Debebe Asefa
(74) *Attorney, Agent, or Firm* — Oblon, McClelland, Maier & Neustadt, L.L.P.

(57) ABSTRACT

Provided is a terminal apparatus including an estimation unit that estimates a channel to a base station by using a reference signal transmitted from the base station, a selection unit that selects a transmission weight desirable for down-link transmission on the channel from a plurality of transmission weight candidates in accordance with an estimation result by the estimation unit, and a feedback controller that controls feedback of the transmission weight selected by the selection unit to the base station. When the selection unit selects two transmission weights or more, the feedback controller feeds back the selected two transmission weights or more to the base station.

20 Claims, 14 Drawing Sheets

(51) Int. Cl.
*H04W 72/04* (2009.01)
*H04W 88/02* (2009.01)
*H04W 88/08* (2009.01)
*H04B 7/24* (2006.01)
*H04B 7/06* (2006.01)
*H04L 1/00* (2006.01)
*H04J 11/00* (2006.01)
*H04B 17/318* (2015.01)
*H04B 7/024* (2017.01)
*H04B 7/0452* (2017.01)

(52) U.S. Cl.
CPC ....... *H04J 11/0026* (2013.01); *H04W 52/243* (2013.01); *H04W 52/265* (2013.01); *H04W 72/042* (2013.01); *H04B 7/024* (2013.01); *H04B 7/0452* (2013.01); *H04W 88/02* (2013.01); *H04W 88/08* (2013.01)

(58) Field of Classification Search
CPC .... H04B 7/0871; H04W 16/28; H04W 72/04; H04W 72/10; H04W 72/1247
See application file for complete search history.

(56) References Cited

OTHER PUBLICATIONS

"3$^{rd}$ Generation Partnership Project; Technical Specification Group Radio Access Network; Evolved Universal Terrestrial Radio Access (E-UTRA); Further advancements for E-UTRA physical layer aspects (Release 9)", 3GPP TR 36.814 V9.0.0 (Mar. 2010), 2010, 104 pages.

Combined Chinese Office Action dated Apr. 24, 2015 in Patent Application No. 201280007429.2 (with English language translation).

Extended Search Report dated Jul. 28, 2014 in European Patent Application No. 12745073.2.

Office Action dated Aug. 12. 2014 in Japanese Patent Application No. 2011-027655.

Alcatel-Lucent, et al., "Summary of enhanced UE PMI feedback Signalling for intra-cell and inter-cell interference avoidance", R1-10-0418, 3GPP TSG RAN WG1 #59bis Meeting, vol. RAN WG1, XP050597949, Jan. 18-22, 2010, 3 pages.

* cited by examiner

FIG. 3

| DESIRED INDEX || DESIRED PAIR INDEX ||
| ORDER | INDEX | ORDER | INDEX |
|---|---|---|---|
| 1 | $V_3$ | 1 | $V_8$ |
| 2 | $V_5$ | 2 | $V_{11}$ |
| 3 | $V_7$ | 3 | $V_2$ |
| ⋮ | — | ⋮ | — |

FEEDBACK INFORMATION

FIG. 4

| INDEX NUMBER CONTROL INFORMATION | (1) NUMBER OF INDEXES<br>(2) NUMBER OF ACTIVE TERMINALS<br>etc. |
|---|---|
| QUALITY STANDARD | (1) THRESHOLD OF RECEIVED POWER<br>(2) THRESHOLD OF SINR<br>etc. |
| INDEX DESIGNATION INFORMATION | DESIRED PAIR INDEXES FED BACK FROM OTHER TERMINALS |

FEEDBACK CONTROL INFORMATION

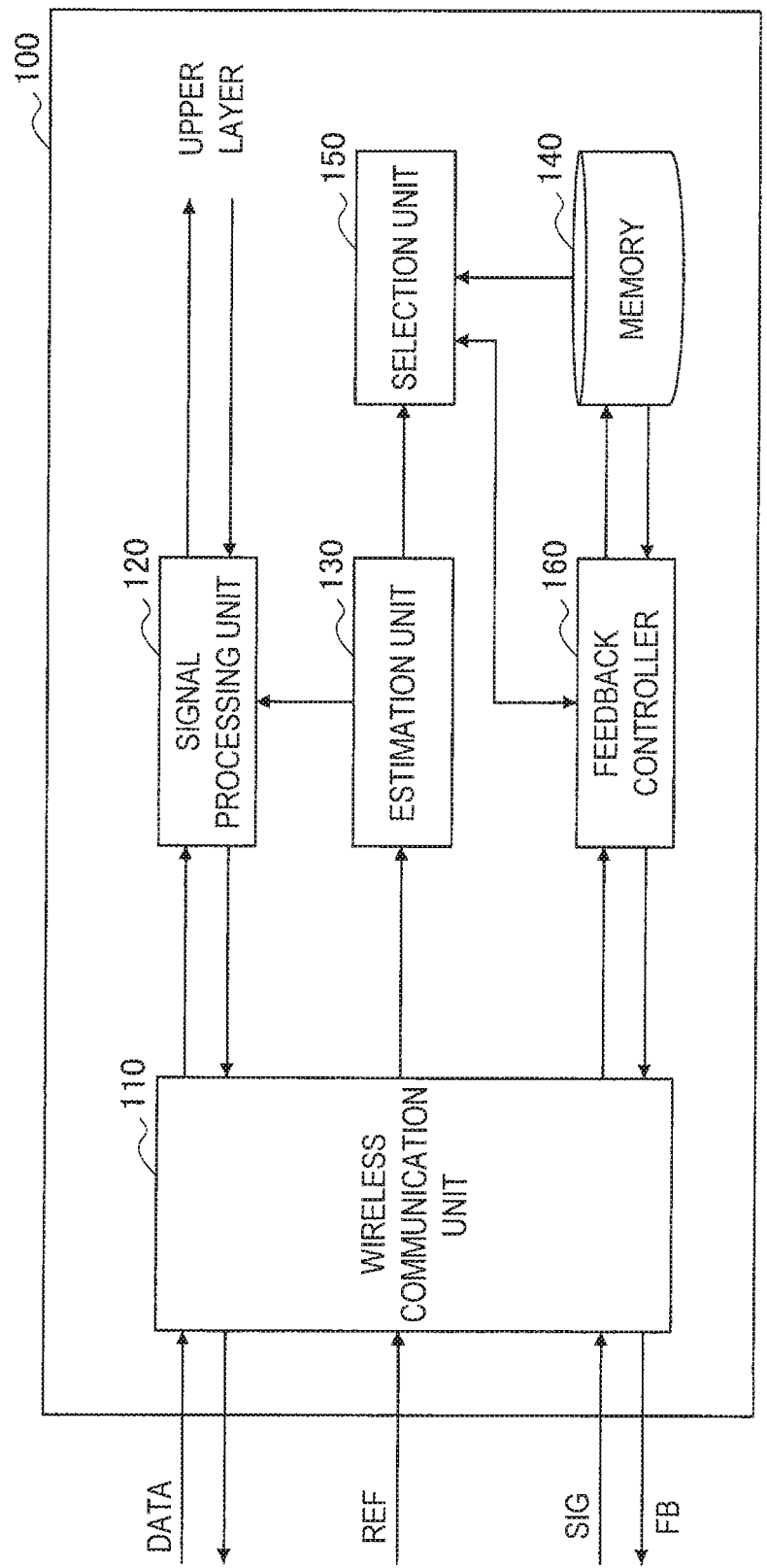

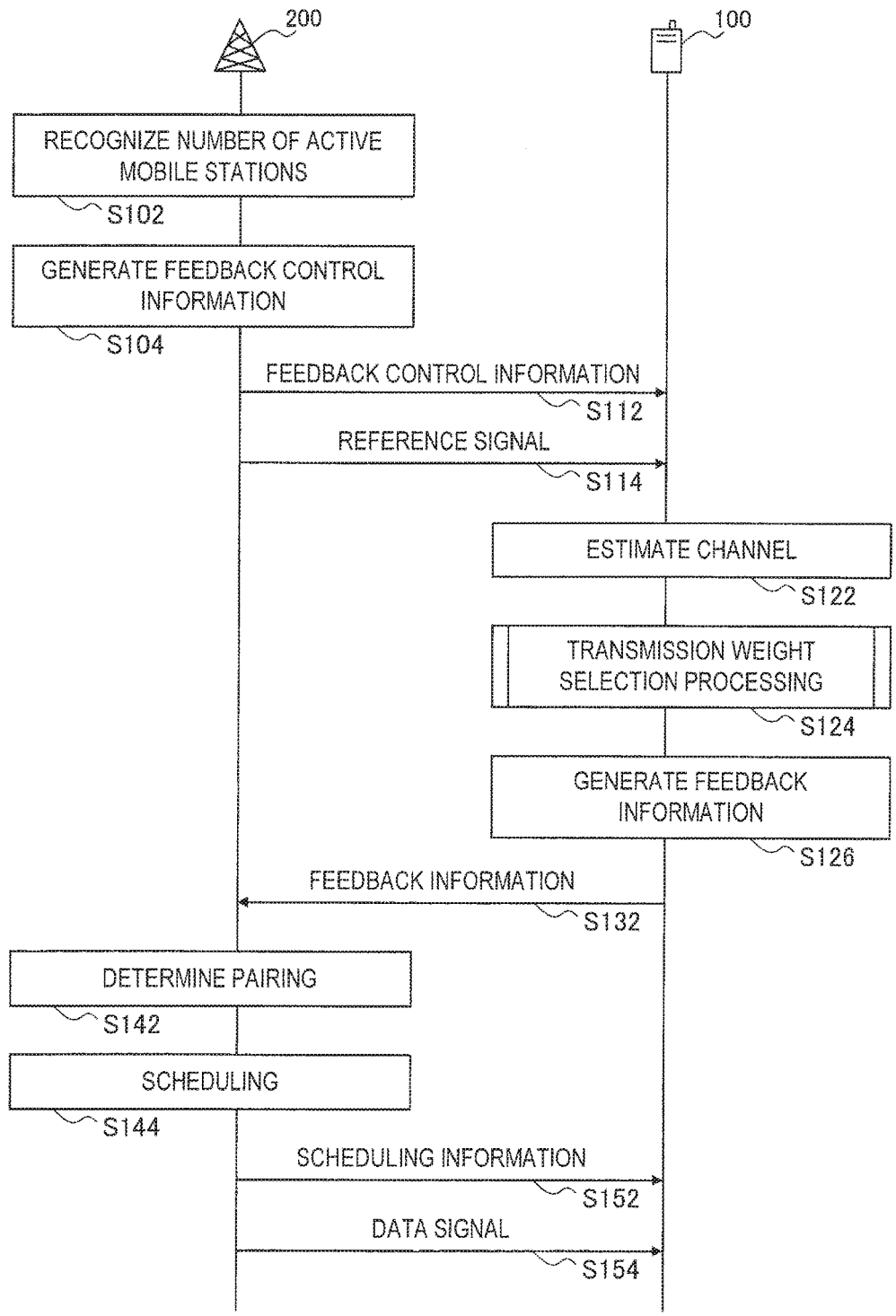

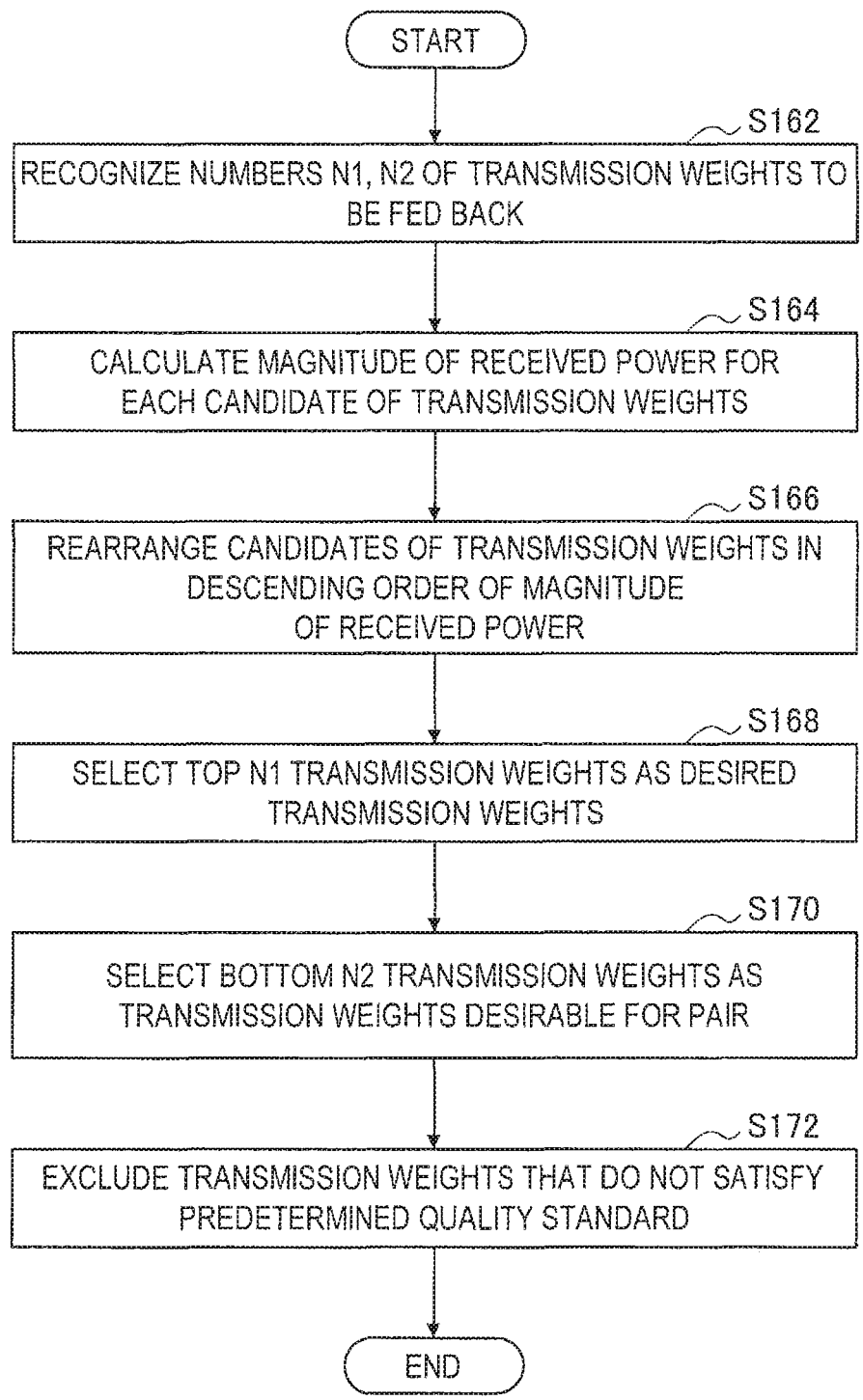

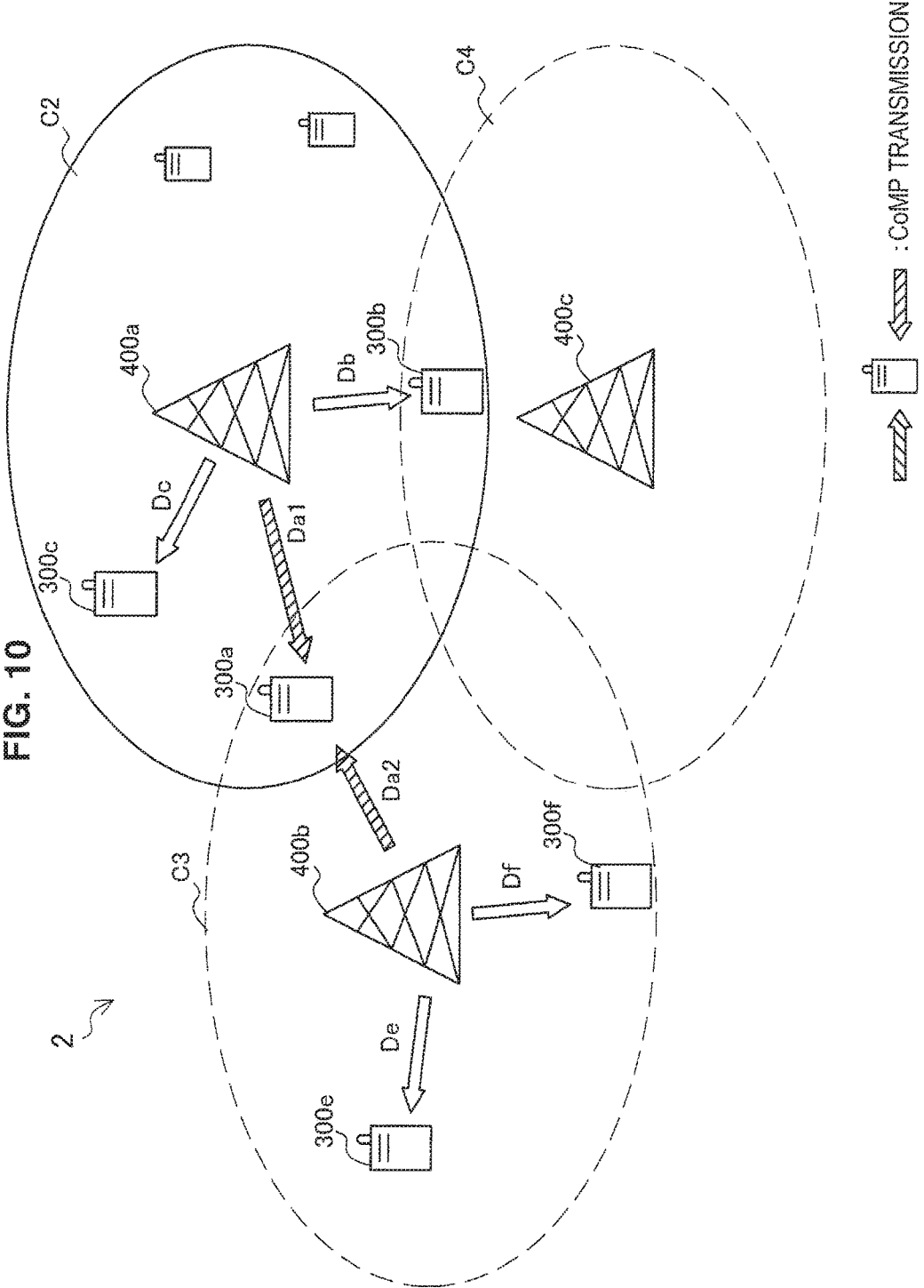

FIG. 11

| | DESIRED INDEX | | DESIRED PAIR INDEX | |
|---|---|---|---|---|
| FEEDBACK FOR SERVING CELL (FB_SRV) | ORDER | INDEX | ORDER | INDEX |
| | 1 | $V_3$ | 1 | $V_8$ |
| | 2 | $V_5$ | 2 | $V_{11}$ |
| | 3 | $V_7$ | 3 | $V_2$ |
| | : | — | : | — |
| | DESIRED INDEX | | DESIRED PAIR INDEX | |
| FEEDBACK FOR NEIGHBORING CELL (FB_NBR) | ORDER | INDEX | ORDER | INDEX |
| | 1 | $V_2$ | 1 | $V_7$ |
| | 2 | $V_4$ | 2 | $V_{10}$ |
| | 3 | $V_6$ | 3 | $V_1$ |
| | : | — | : | — |

FEEDBACK INFORMATION

FIG. 12

| INDEX NUMBER CONTROL INFORMATION | (1) NUMBER OF INDEXES<br>(2) NUMBER OF ACTIVE TERMINALS<br>(3) QUALITY RELATED PARAMETERS (SERVING CELL)<br>(4) QUALITY RELATED PARAMETERS (NEIGHBORING CELL)<br>etc. |
|---|---|
| QUALITY STANDARD | (1) THRESHOLD OF RECEIVED POWER<br>(2) THRESHOLD OF SINR<br>etc. |
| INDEX DESIGNATION INFORMATION | DESIRED PAIR INDEXES FED BACK FROM OTHER TERMINALS |

FEEDBACK CONTROL INFORMATION

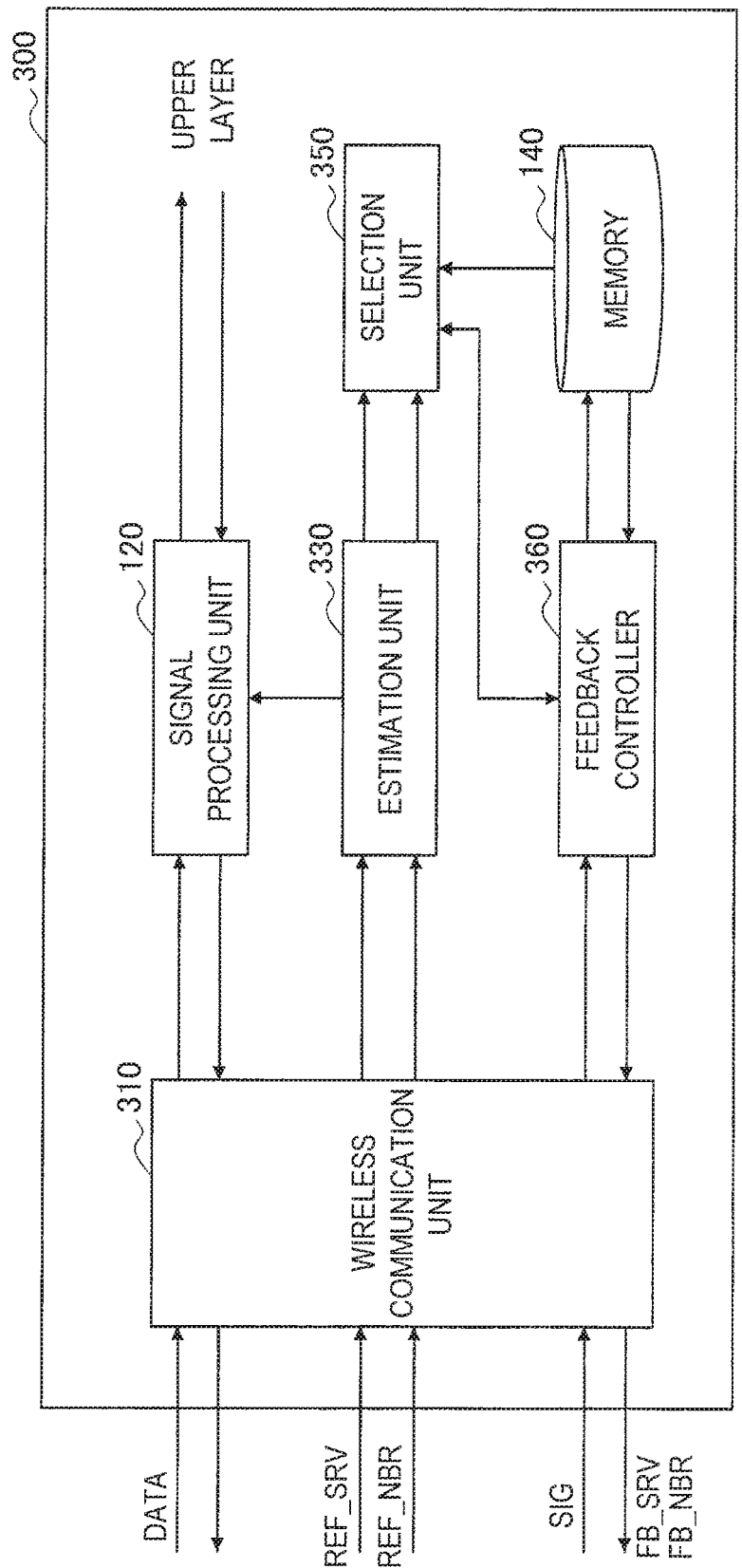

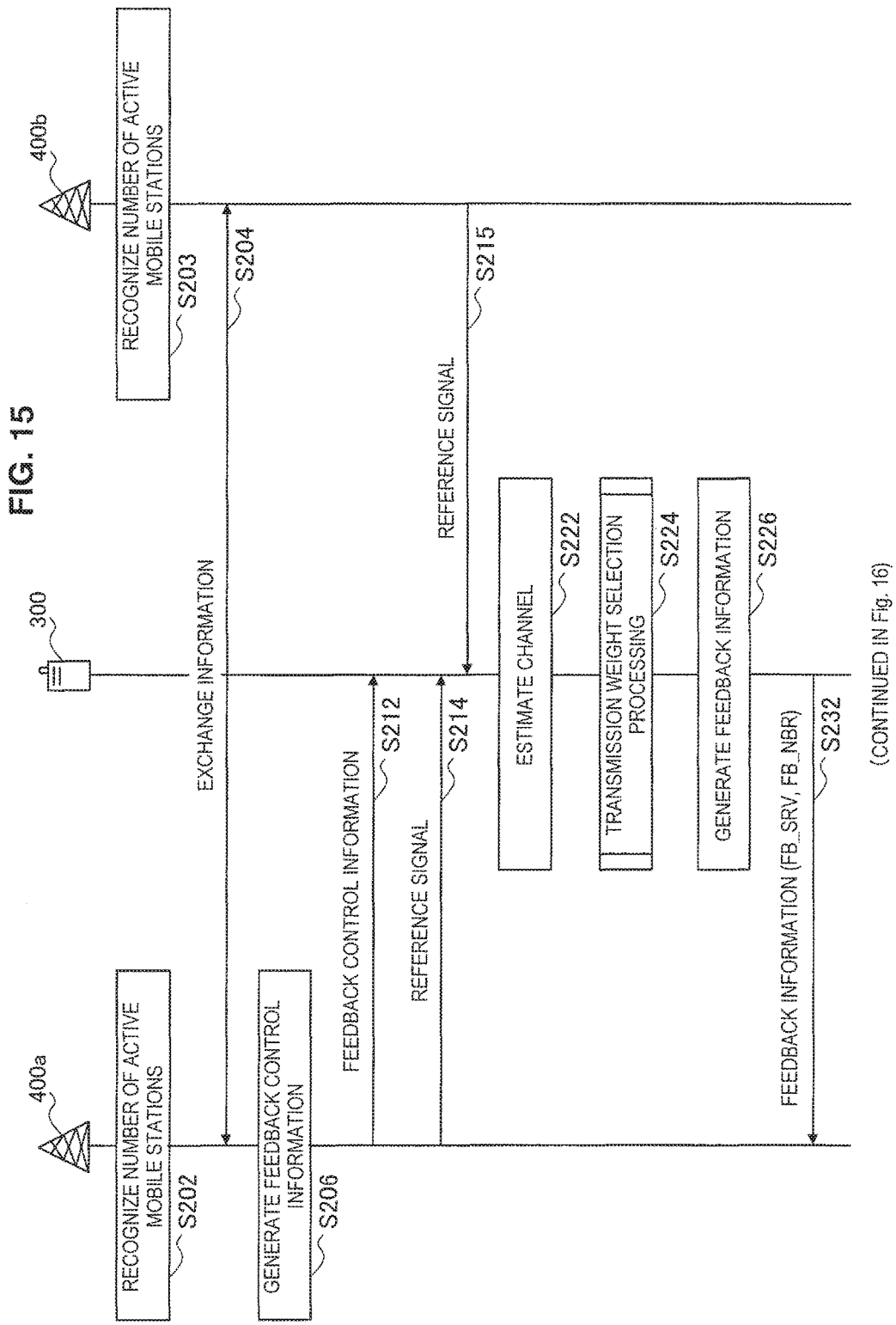

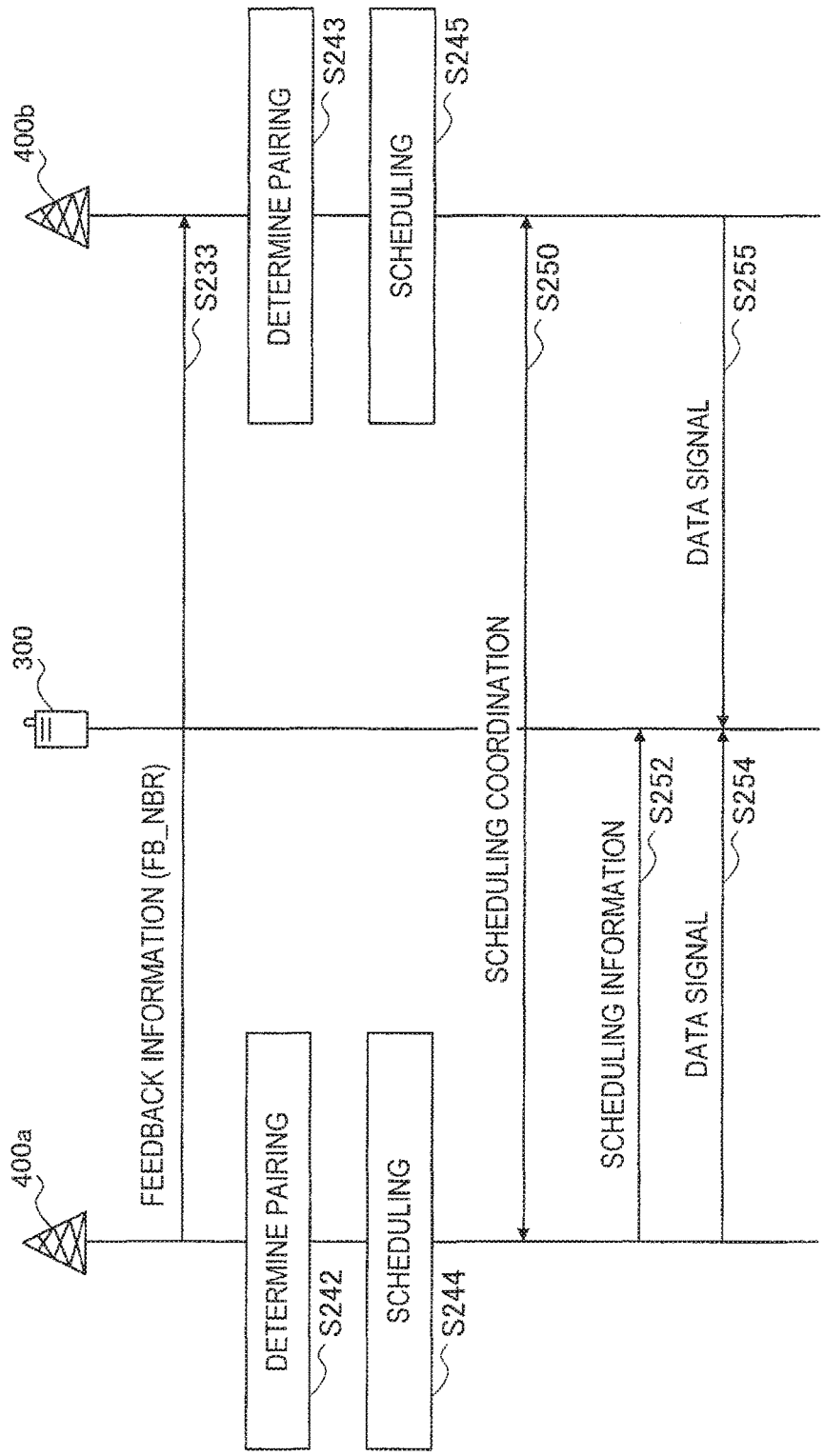

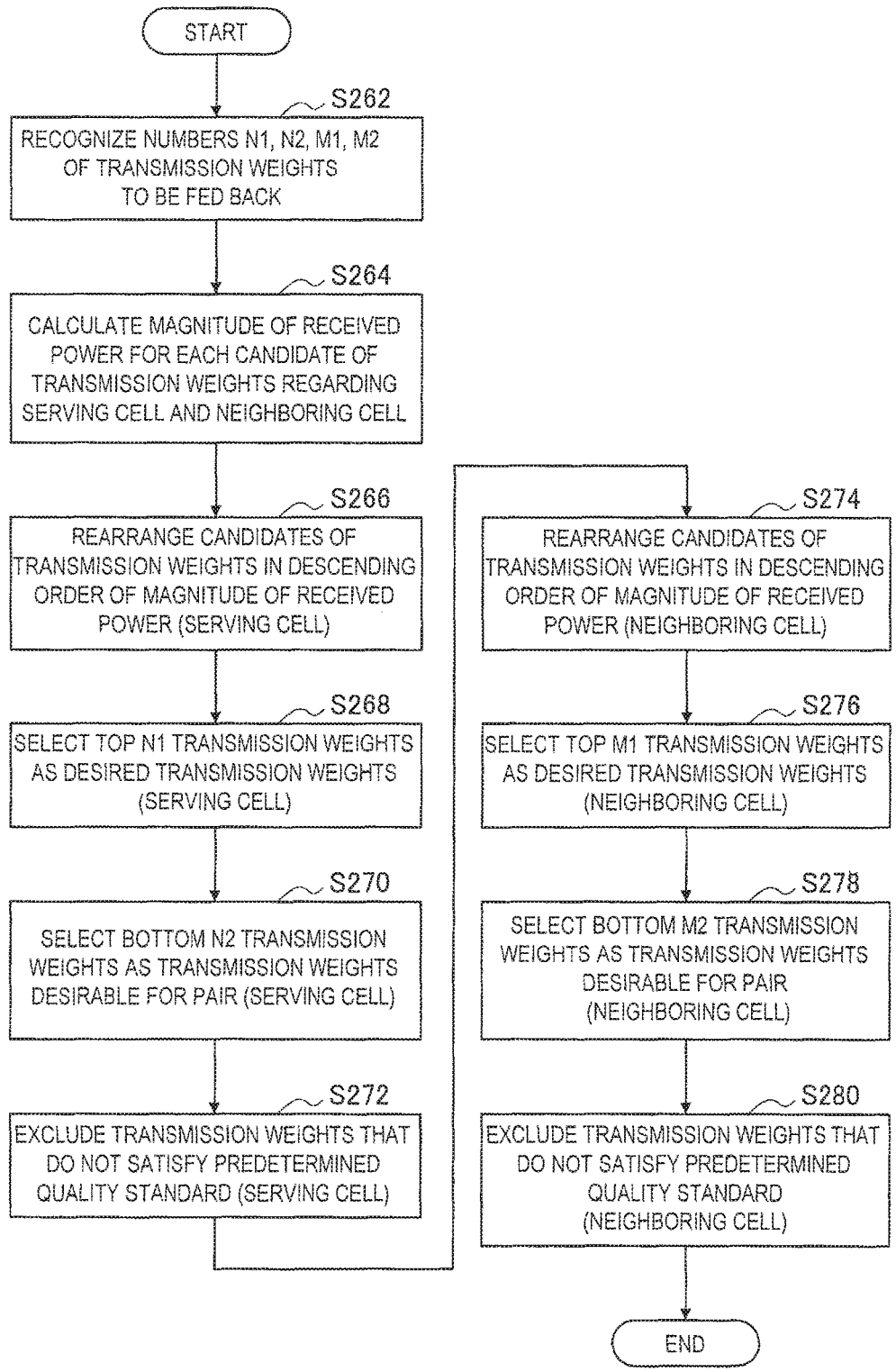

TERMINAL APPARATUS, FEEDBACK CONTROL METHOD, BASE STATION, PAIRING CONTROL METHOD, PROGRAM, AND WIRELESS COMMUNICATION SYSTEM

CROSS REFERENCE TO RELATED CASES

The present application is a continuation of application Ser. No. 13/981,145, filed Jul. 23, 2013, which is a National Stage of PCT/JP2012/05179, filed Jan. 27, 2012, and claims the benefit of priority to Japanese Application No. 2011-027655, filed Feb. 10, 2011, the contents of which are all hereby incorporated by reference in their entirety.

TECHNICAL FIELD

The present disclosure relates to a terminal apparatus, a feedback control method, a base station, a pairing control method, a program, and a wireless communication system.

BACKGROUND ART

In the standardization of cellular communication technology of the fourth generation (4G) including LTE-A (Long Term Evolution-Advanced), MU-MIMO (Multiple User-Multiple Input Multiple Output) as further development of SU-MIMO (Single User-Multiple Input Multiple Output) is receiving attention. MU-MIMO is a technology enabling communication of a plurality of users in the same band simultaneously by spatial multiplexing and is expected to significantly improve communication throughput (see, for example, Non-Patent Literature 1 below).

SU-MIMO is used in LTE (Long Term Evolution), which is also called the cellular communication technology of the 3.9-th generation. In SU-MIMO, a base station selects a transmission weight to be used for pre-coding of down-link transmission in accordance with channels to individual base stations. However, it is difficult for the base station alone to know the channel to a mobile station and thus, feedback about the channel is given from the mobile station to the base station. One feedback method that can be used in LTE is the Implicit Feedback method. In the Implicit Feedback method, a predetermined number of transmission weights are prepared in advance. Then, an index of one transmission weight most suited to the channel estimated by the mobile station using a reference signal from the base station is fed back from the mobile station to the base station.

CITATION LIST

Non-Patent Literature

Non-Patent Literature 1: "3GPP TR 36.814 V9.0.0 (2010-03)", 3rd Generation Partnership Project, Technical Specification Group Radio Access Network, Evolved Universal Terrestrial Radio Access (E-UTRA), Further advancements for E-UTRA physical layer aspects (Release 9)

SUMMARY OF INVENTION

Technical Problem

In MU-MIMO, a problem of how to select a plurality of users spatially multiplexed, that is, a problem of pairing for spatial multiplexing arises. When, for example, a user U1 for whom a transmission weight $V_1$ is optimum and a user U2 for whom a transmission weight $V_2$ is optimum are spatially multiplexed, there is a possibility that down-link transmission to the user U1 and down-link transmission to the user U2 interfere with each other. The magnitude of interference is not predictable from a combination of transmission weights and is subject to various conditions such as the physical relationship between users and the communication environment around the users. However, if one transmission weight is simply fed back from one mobile station like the Implicit Feedback method of SU-MIMO, there is no degree of freedom of pairing and it is difficult to achieve flexible pairing that suppresses interference. Therefore, it is desirable that a feedback system enabling a base station to determine pairing more flexibly be provided.

Technology according to the present disclosure provides a terminal apparatus, a feedback control method, a base station, a pairing control method, a program, and a wireless communication system allowing to determine pairing for MU-MIMO flexibly.

Solution to Problem

According to an embodiment of the present disclosure, there is provided a terminal apparatus including an estimation unit that estimates a channel to a base station by using a reference signal transmitted from the base station, a selection unit that selects a transmission weight desirable for down-link transmission on the channel from a plurality of transmission weight candidates in accordance with an estimation result by the estimation unit, and a feedback controller that controls feedback of the transmission weight selected by the selection unit to the base station. When the selection unit selects two transmission weights or more, the feedback controller feeds back the selected two transmission weights or more to the base station.

The feedback controller may feed back transmission weights of a number determined in accordance with a number of active terminal apparatuses belonging to the base station.

The terminal apparatus may further include a wireless communication unit that receives feedback control information indicating the number of the active terminal apparatuses from the base station. The feedback controller may determine the number of the transmission weights in accordance with the number of the active terminal apparatuses belonging to the base station by using the feedback control information.

The terminal apparatus may further include a wireless communication unit that receives feedback control information indicating the number of the transmission weights determined by the base station in accordance with the number of the active terminal apparatuses. The feedback controller may feed back the transmission weights of the number indicated by the feedback control information to the base station.

The terminal apparatus may further include a wireless communication unit that receives feedback control information designating transmission weights fed back from another terminal apparatus to the base station, and the transmission weights are desirable for first down-link transmission spatially multiplexed on the channel with second down-link transmission from the base station to the another terminal apparatus. When the transmission weight selected by the selection unit is contained in the transmission weights indicated by the feedback control information, the feedback controller may feed back the transmission weight selected by the selection unit to the base station.

When the two transmission weights or more satisfying a predetermined quality standard of the down-link transmission on the channel are present, the selection unit may select the two transmission weights or more.

The terminal apparatus may be provided with a wireless communication service from a first base station as a serving base station on a first channel, the estimation unit may estimate a second channel to a second base station by using a reference signal transmitted from the second base station in a neighboring cell, the selection unit may select a transmission weight desirable for down-link transmission on the second channel in accordance with the estimation result by the estimation unit, and the feedback controller may feed back the transmission weight selected by the selection unit to the second base station via the first base station.

The selection unit may select the transmission weights desirable for the down-link transmission on the second channel of a number determined in accordance with parameters related to quality of down-link transmission on the first channel.

The parameters may include a distance between the first base station and the terminal apparatus, received power of the down-link transmission on the first channel, SINR, or a transmission delay.

The selection unit may select the transmission weights desirable for the down-link transmission on the second channel of a number determined in accordance with parameters related to quality of the down-link transmission on the second channel.

The parameters may include a distance between the second base station and the terminal apparatus, received power of the down-link transmission on the second channel, SINR, or a transmission delay.

The selection unit may be capable of selecting a transmission weight of a first type desirable for down-link transmission on the first channel and a transmission weight of a second type desirable for the down-link transmission on the second channel. When the down-link transmission on the first channel is not spatially multiplexed with other down-link transmission by the first base station, only the one transmission weight of the first type may be fed back.

The selection unit may be capable of selecting a transmission weight of a first type desirable for down-link transmission on the first channel and a transmission weight of a second type desirable for the down-link transmission on the second channel. When the down-link transmission on the second channel is not spatially multiplexed with other down-link transmission by the second base station, only the one transmission weight of the second type may be fed back.

According to another embodiment of the present disclosure, there is provided a feedback control method by a terminal apparatus to control feedback to a base station, the feedback control method including estimating a channel to the base station by using a reference signal transmitted from the base station, selecting a transmission weight desirable for down-link transmission on the channel from a plurality of transmission weight candidates in accordance with an estimation result of the channel, and giving feedback of the selected transmission weight to the base station. When two transmission weights or more are selected, the selected two transmission weights or more are fed back to the base station.

According to another embodiment of the present disclosure, there is provided a program for causing a computer controlling a terminal apparatus to function as an estimation unit that estimates a channel to a base station by using a reference signal transmitted from the base station, a selection unit that selects a transmission weight desirable for down-link transmission on the channel from a plurality of transmission weight candidates in accordance with an estimation result by the estimation unit, and a feedback controller that controls feedback of the transmission weight selected by the selection unit to the base station. When the selection unit selects two transmission weights or more, the feedback controller feeds back the selected two transmission weights or more to the base station.

According to another embodiment of the present disclosure, there is provided a base station including a wireless communication unit that transmits a reference signal to a terminal apparatus, a feedback acquisition unit that acquires feedback about a transmission weight selected by the terminal apparatus from a plurality of transmission weight candidates in accordance with an estimation result of a channel using the reference signal and desirable for down-link transmission on the channel, and a pairing controller that controls pairing for spatial multiplexing of the terminal apparatus and another terminal apparatus by using the feedback acquired by the feedback acquisition unit. When feedback about two transmission weights or more is acquired by the feedback acquisition unit from the terminal apparatus, the pairing controller selects a transmission weight to be used for the terminal apparatus from the two transmission weights or more so that interference caused when the terminal apparatus is paired with the another terminal apparatus becomes smaller.

According to another embodiment of the present disclosure, there is provided a pairing control method by a base station to control pairing between terminal apparatuses based on feedback from a terminal apparatus, the paring control method including transmitting a reference signal to a terminal apparatus, acquiring feedback about a transmission weight selected by the terminal apparatus from a plurality of transmission weight candidates in accordance with an estimation result of a channel using the reference signal and desirable for down-link transmission on the channel, determining pairing for spatial multiplexing of the terminal apparatus and another terminal apparatus by using the acquired feedback, and when feedback about two transmission weights or more is acquired from the terminal apparatus, selecting a transmission weight to be used for the terminal apparatus from the two transmission weights or more so that interference caused when the terminal apparatus is paired with the another terminal apparatus becomes smaller.

According to another embodiment of the present disclosure, there is provided a program for causing a computer controlling a base station including a wireless communication unit that transmits a reference signal to a terminal apparatus to function as a feedback acquisition unit that acquires feedback about a transmission weight selected by the terminal apparatus from a plurality of transmission weight candidates in accordance with an estimation result of a channel using the reference signal and desirable for down-link transmission on the channel, and a pairing controller that controls pairing for spatial multiplexing of the terminal apparatus and another terminal apparatus by using the feedback acquired by the feedback acquisition unit. When feedback about two transmission weights or more is acquired by the feedback acquisition unit from the terminal apparatus, the pairing controller selects a transmission weight to be used for the terminal apparatus from the two transmission weights or more so that interference caused when the terminal apparatus is paired with the another terminal apparatus becomes smaller.

According to another embodiment of the present disclosure, there is provided a wireless communication system including a terminal apparatus and a base station. The terminal apparatus includes an estimation unit that estimates a channel to the base station by using a reference signal transmitted from the base station, a selection unit that selects a transmission weight desirable for down-link transmission on the channel from a plurality of transmission weight candidates in accordance with an estimation result by the estimation unit, and a feedback controller that controls feedback of the transmission weight selected by the selection unit to the base station. When the selection unit selects two transmission weights or more, the feedback controller feeds back the selected two transmission weights or more to the base station. The base station includes a wireless communication unit that transmits the reference signal to the terminal apparatus, a feedback acquisition unit that acquires the feedback from the terminal apparatus, and a pairing controller that controls pairing for spatial multiplexing of the terminal apparatus and the other terminal apparatus by using the feedback acquired by the feedback acquisition unit.

Advantageous Effects of Invention

According to a terminal apparatus, a feedback control method, a base station, a pairing control method, a program, and a wireless communication system in the present disclosure, as described above, pairing for MU-MIMO can flexibly be determined.

BRIEF DESCRIPTION OF DRAWINGS

FIG. 3 is an explanatory view showing an example of feedback information according to the first embodiment.

FIG. 4 is an explanatory view showing an example of feedback control information according to the first embodiment.

FIG. 5 is a block diagram showing an example of the configuration of a mobile station according to the first embodiment.

FIG. 8 is a sequence diagram showing an example of the flow of feedback control processing according to the first embodiment.

FIG. 9 is a flow chart showing an example of a detailed flow of transmission weight selection processing shown in FIG. 8.

FIG. 10 is an explanatory view showing an overview of a cellular communication system according to a second embodiment.

FIG. 11 is an explanatory view showing an example of feedback information according to the second embodiment.

FIG. 12 is an explanatory view showing an example of feedback control information according to the second embodiment.

FIG. 13 is a block diagram showing an example of the configuration of a mobile station according to the second embodiment.

FIG. 15 is the first half of a sequence diagram showing an example of the flow of feedback control processing according to the second embodiment.

FIG. 16 is the second half of the sequence diagram showing an example of the flow of feedback control processing according to the second embodiment.

FIG. 17 is a flow chart showing an example of the detailed flow of transmission weight selection processing shown in FIG. 16.

DESCRIPTION OF EMBODIMENTS

Figure 1:
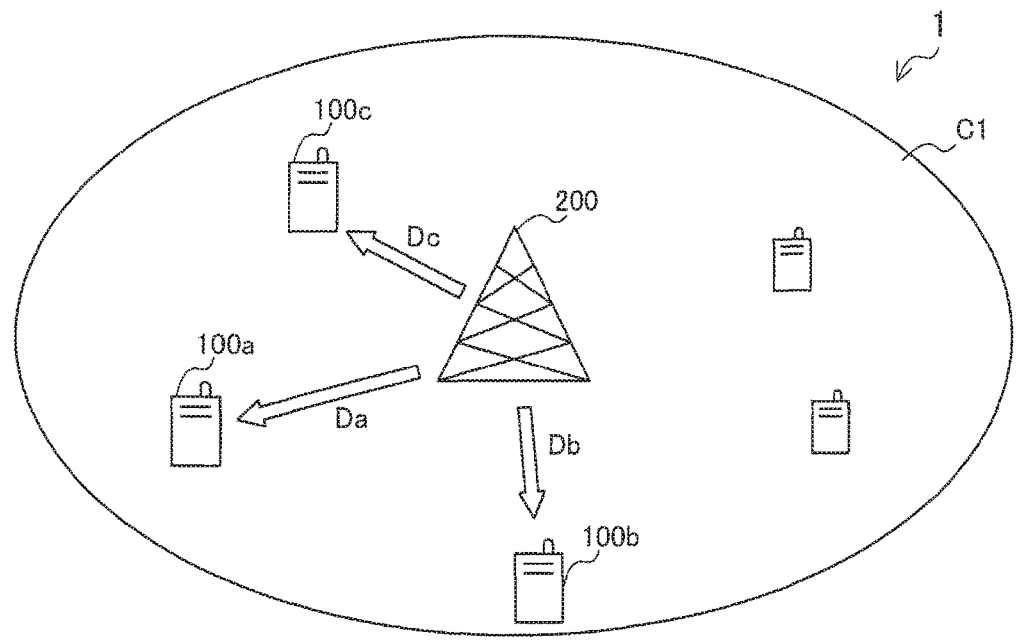
FIG. 1 is an explanatory view showing an overview of a cellular communication system according to a first embodiment.

Hereinafter, preferred embodiments of the present invention will be described in detail with reference to the appended drawings. Note that, in this specification and the drawings, elements that have substantially the same function and structure are denoted with the same reference signs, and repeated explanation is omitted.

"Detailed Descriptions of Embodiments" will be described in the following order:
1. Description of Related Technologies
1-1. Types of Feedback Methods
1-2. Types of Transmission Weights
1-3. CoMP (Coordinated MultiPoint)
2. First Embodiment
2-1. System Overview
2-2. Configuration Example of Mobile Station
2-3. Configuration Example of Base Station
2-4. Example of Flow of Processing
2-5. Summary of First Embodiment
3. Second Embodiment
3-1. System Overview
3-2. Configuration Example of Mobile Station
3-3. Configuration Example of Base Station
3-4. Example of Flow of Processing
3-5. Summary of Second Embodiment 1. Description of Related Technologies First, some technologies related to the technology disclosed herein will be described.

1-1. Types of Feedback Methods

Feedback methods that can be used to realize SU-MIMO in LTE include three methods, the Explicit Feedback method, the SRS(Sounding Reference Symbol)-based Feedback method, and the above Implicit Feedback method. Among these methods, the Explicit Feedback method is a method in which a transfer function itself of the channel estimated by a base station using a reference signal from a mobile station fed back from the mobile station to the base station. The SRS-based Feedback method is a method in which a base station estimates an up-link channel by using a reference signal from a mobile station to derive a transfer function of a down-link channel from a transfer function of the estimated up-link channel.

In contrast, the Implicit Feedback method is a method in which, among a predetermined number of transmission weights to which indexes are attached in advance, the index of the transmission weight most suited to a down-link channel estimated by a mobile station is fed back from the mobile station to a base station.

For example, the transfer function of the channel estimated by the base station using a reference signal from the mobile station is set as H. Also, N (for example, N=16) transmission weights prepared in advance are each represented as $V_X$ (X is an index. X=1, 2, . . . , N). Then, the mobile station can calculate the magnitude of received power expected when each transmission weight is used from the product of the transfer function H and the transmission weight $V_X$. Then, the mobile station feeds back the index $X_{max}$ of the transmission weight $V_{Xmax}$ yielding the largest expected received power to the base station. As a result, a data signal can be pre-coded by using the transmission weight $V_{Xmax}$ for down-link transmission from the base station to the mobile station.

Compared with the Explicit Feedback method, the Implicit Feedback method is a method in which the amount of information fed back from the mobile station to the base station is small, that is, overhead of signaling is small. In addition, the Implicit Feedback method does not need transmission of a reference signal by a mobile station as is required by the SRS-based Feedback method. Thus, the technology disclosed herein can be considered to be an extension of the Implicit Feedback method whose overhead is small and which can simply be implemented as a feedback method for pairing of MU-MIMO.

1-2. Types of Transmission Weights

In the standard specifications of LTE-A, 2-stage transmission weights are used in pre-coding of MIMO. The transmission weight in the first stage is a transmission weight realizing directivity to spatially separate a plurality of mobile stations based on a direction to the base station as a reference. For example, one cell is divided into three sectors each having an angle of 120 degrees and each sector is covered by beams in four directions. The transmission weight in the second stage is a non-directional transmission weight to maximize received power by adjusting the phase of a signal on a communication path between the base station and each mobile station. Compared with the transmission weight in the first stage, the transmission weight in the second stage covers a narrower frequency region. Moreover, the transmission weight in the second stage is updated more frequently.

If, for example, the transmission weight in the first stage is termed W1, the transmission weight W1 can be expressed as follows by using a distance $d_k$ from a reference antenna to a k-th antenna, a signal wavelength $\lambda$, and a direction $\theta$ of a beam:

[Math 1]

$$W1 = \begin{bmatrix} 1 \\ \exp\left(-\frac{j2\pi}{\lambda}d_1\sin\theta(i)\right) \\ \exp\left(-\frac{j2\pi}{\lambda}d_2\sin\theta(i)\right) \\ \exp\left(-\frac{j2\pi}{\lambda}d_3\sin\theta(i)\right) \end{bmatrix} \quad (1)$$

The transmission weight in the second stage can take a form of a matrix having a phase rotation vector selected from candidates of a plurality of phase rotation vectors in each row. Two examples of the transmission weight in the second stage W2 will be shown below.

[Math 2]

$$W2 = \begin{bmatrix} 1 & 1 \\ 1 & -1 \end{bmatrix}, \begin{bmatrix} 1 & 1 \\ j & -j \end{bmatrix} \quad (2)$$

If the data signal transmitted from the base station is termed S, a reception signal R observed in a mobile station is given by R=HW1W2S or R=HW2W1S. To simplify the description herein, these two transmission weights are not distinguished from each other. In the description that follows, the transmission weight V may be understood to mean V=W1W2 or V=W2W. The actual number of candidates of the transmission weight V may correspond to the product of the number of candidates of the transmission weight in the first stage W1 and the number of candidates of the transmission weight in the second stage W2.

1-3. CoMP (Coordinated MultiPoint)

CoMP (Coordinated MultiPoint) is a technology that can be used to improve characteristics of a mobile station positioned particularly near a cell edge. CoMP mainly includes two ideas of Joint Processing and Coordinated Scheduling and/or Beamforming.

Joint Processing refers to simultaneous transmission of data in a down-link from a plurality of base stations to one mobile station or simultaneous transmission of data in an up-link from one mobile station to a plurality of base stations. With data being transmitted/received by a plurality of base stations, the antenna gain is increased and SINR (Signal-to-Interference-plus-Noise Ratio) is improved. Data distribution for Joint Processing of a down-link and data combination for Joint Processing for an up-link are performed via a back haul link between base stations. Data may be combined in any of a stage of decoded bits, a stage of bits before decoding, and a stage before demapping (performance is improved if data is combined in a later stage, though the amount of data to be processed increases).

Coordinated Scheduling and/or Beamforming refers to coordinated scheduling and/or beamforming between neighboring base stations. Scheduling means determining the allocation of resource blocks to mainly mobile stations. A scheduler is normally implemented in the MAC (Media Access Control) layer of each base station. Therefore, with schedulers of neighboring base stations mutually coordinating, scheduling and/or beam directivity can be adjusted so that interference between traffic of a plurality of mobile stations is suppressed.

CoMP has a possibility of being utilized in combination with MU-MIMO. That is, for example, down-link transmission to a mobile station spatially multiplexed with another mobile station in some cell can be combined with down-link transmission from neighboring cells by Joint Processing. In addition, on this occasion, scheduling can be coordinated between neighboring base stations. The second embodiment described later focuses on a combination of MU-MIMO and CoMP.

2: First Embodiment

2-1. System Overview (1) System Configuration Example

FIG. 1 is an explanatory view showing an overview of a cellular communication system 1 according to the first embodiment. Referring to FIG. 1, the cellular communication system 1 includes a plurality of mobile stations 100a to 100c and a base station 200. When there is no need to distinguish the plurality of mobile stations 100a to 100c in the description below, such mobile stations will generically be called a mobile station 100 by omitting the alphabet at the end of the code. This also applies to other elements.

The mobile station 100 is typically a terminal apparatus called UE (User Equipment). The mobile station 100 receives a radio signal transmitted from the base station 200 on a down-link channel with the base station 200 and transmits a radio signal to the base station 200 on an up-link channel with the base station 200. The mobile station 100 may also operate as a relay node relaying a radio signal between the base station 200 and another terminal apparatus.

The base station 200 is a communication apparatus also called BTS (Base Transceiver Station) or eNodeB. The base station 200 provides cellular communication services to the mobile station 100 positioned in a cell C1. That is, in the example of FIG. 1, the base station 200 is a serving base station for the mobile stations 100a, 100b, 100c. Communication by the mobile station 100 typically draws up a schedule by a scheduler implemented in the MAC layer of the base station 200. In LTE and LTE-A, a schedule is drawn up in units of one resource block including seven OFDM symbols in the time direction and 12 subcarriers in the frequency direction. Then, in MU-MIMO, a plurality of the mobile stations 100 is scheduled in one resource block.

In the example of FIG. 1, for example, any combination of down-link transmission Da to the mobile station 100a, down-link transmission Db to the mobile station 100b, and down-link transmission Dc to the mobile station 100c can be spatially multiplexed in one resource block. Pairing refers to a determination made by the base station 200 of which mobile station to spatially multiplex with which mobile station. An important thing when determining pairing is that interference between radio signals that are mutually spatially multiplexed is as small as possible. The magnitude of interference depends on, in addition to the transmission weight used for the individual mobile stations 100, factors such as the communication environment (for example, the intensity of noise in accordance with location and also presence of reflected waves) around the mobile station 100 and the physical relationship between the mobile stations 100. In the present embodiment, therefore, the base station 200 utilizes estimation results of channels of the individual mobile stations 100 to determine the optimum pairing having less interference.

As a mechanism for the base station 200 to utilize estimation results of channels of the individual mobile stations 100, the above Implicit Feedback method is useful in that overhead of signaling is small and implementation thereof is simple. However, in the present Implicit Feedback method, the index of only one transmission weight most desirable for the mobile station 100 is fed back to the base station 200. In the present embodiment, by contrast, firstly if a plurality of transmission weights desirable for the mobile station 100 is present, the indexes of the plurality of transmission weights are fed back from the mobile station 100 to the base station 200. Accordingly, the range of selection of the combination of pairing by the base station 200 can be extended. Secondly, the certain mobile station 100 is caused to give feedback of the index of the transmission weight desirable for the mobile station 100 as the transmission weight of the partner of pairing to the base station 200. Accordingly, the base station 200 can judge the other mobile station 100 desirable for pairing with the certain mobile station 100 more appropriately.

Figure 2:
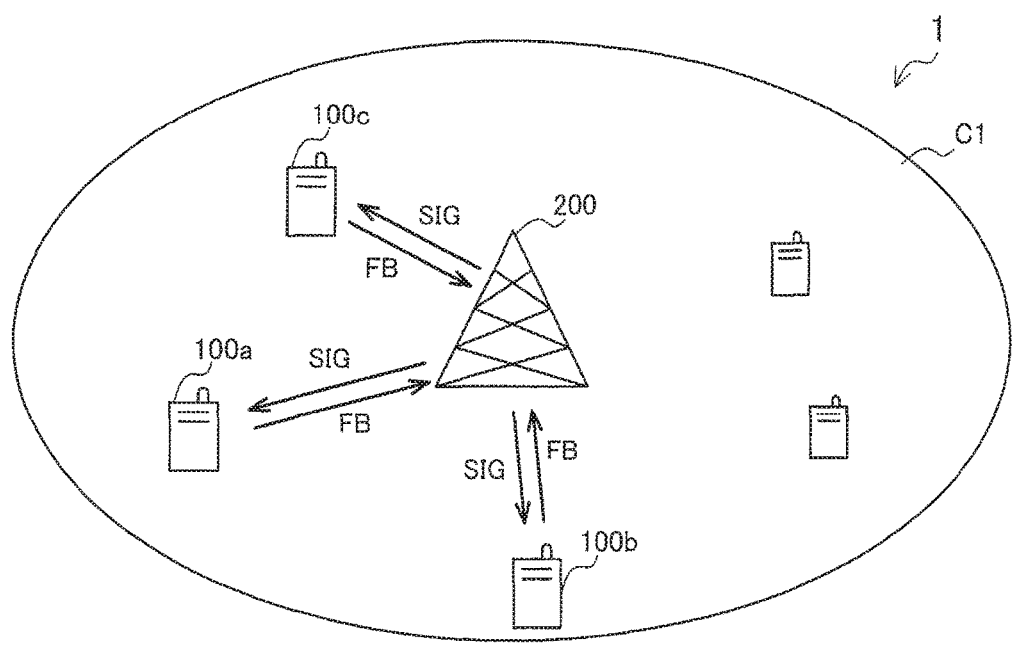
FIG. 2 is an explanatory view illustrating information exchanged between a base station and mobile stations in the system exemplified in FIG. 1.

Such a mechanism of new feedback is supported by signaling shown in FIG. 2 as a simplified diagram. That is, the base station 200 provides feedback control information SIG to each of the mobile stations 100. Though not essential in the present embodiment, the feedback control information SIG is introduced to reduce overhead while maintaining mainly effectiveness of feedback. Then, each of the mobile stations 100 transmits feedback information FB to the base station 200.

(2) Example of Feedback Information

FIG. 3 is an explanatory view showing an example of feedback information according to the first embodiment. Referring to FIG. 3, the feedback information FB as an example contains two pieces of information, a desired index and a desired pair index.

The desired index is an index of one transmission weight or more desirable for the mobile station 100 that generates the feedback information FB to be used for down-link transmission from the base station 200 to the local apparatus. In the example of FIG. 3, the feedback information FB contains three indexes $V_3$, $V_5$, $V_7$ (actually, subscripts 3, 5, and 7 indicate indexes). Individual indexes contained as desired indexes have the order. The first desired index is the index of, among N transmission weights prepared in advance, the transmission weight that maximizes expected received power. The first desired index is also fed back in the existing Implicit Feedback method. The second desired index is the index of the transmission weight whose expected received power is the second largest. The third desired index is the index of the transmission weight whose expected received power is the third largest. The order of these transmission weights can be derived by using a transfer function H of the channel estimated by the mobile station 100.

The desired pair index is an index of the transmission weight desirable for the mobile station 100 that generates the feedback information FB for down-link transmission to the other mobile station 100 to be paired. In the example of FIG. 3, the feedback information FB contains three indexes $V_8$, $V_{11}$, $V_2$ (actually, subscripts 8, 11, and 2 indicate indexes). Individual indexes contained as desired pair indexes also have the order. The first desired pair index is an index of, among N transmission weights prepared in advance, the transmission weight that minimizes predicted interference power. The second desired pair index is an index of the transmission weight whose predicted interference power is the second smallest. The third desired pair index is an index of the transmission weight whose predicted interference power is the third smallest. The order of these transmission weights can also be derived by using the transfer function H of the channel estimated by the mobile station 100.

(3) Example of Feedback Control Information

FIG. 4 is an explanatory view showing an example of feedback control information according to the first embodiment. Referring to FIG. 4, feedback control information SIG as an example can contain three pieces of information, index number control information, a quality standard, and index designation information.

The index number control information is information to control the numbers of desired indexes and desired pair indexes to be fed back by the mobile station 100 to the base station 200. The index number control information may be information representing the number itself of indexes to be fed back. Instead, the index number control information may be information representing the number of active (that is, connected mode, instead of idle mode) mobile stations belonging to the base station 200.

The quality standard is information designating the standard of communication quality that should be satisfied by transmission weights corresponding to indexes to be fed back. The quality standard may also be information representing the threshold of received power. Alternatively, the quality standard may be information representing the threshold of SINR. If, for example, only two transmission weights predicted to satisfy the quality standard (for example, received power exceeding the threshold can be expected) are present even if three desired indexes should be fed back, the mobile station 100 can feed back only the indexes of the two transmission weights as the desired indexes. Also if, for example, only two transmission weights predicted to satisfy the quality standard (for example, predicted interference power falls short the threshold) are present even if three desired pair indexes should be fed back, the mobile station 100 can feed back only the indexes of the two transmission weights as the desired pair indexes.

The index designation information is information to search for the mobile station 100 that feeds back a specific index as a desired index. Typically, the index designation information contains a desired pair index fed back from the certain mobile station 100 to the base station 200 and is broadcast from the base station 200. The mobile station 100 whose desired index does not match index designation information may avoid useless signaling by stopping or delaying feedback.

Incidentally, a portion of information exemplified in FIGS. 3 and 4 may not be contained in feedback information or feedback control information. In addition, other additional information may be contained in feedback information or feedback control information. Further, a portion of feedback control information may be stored in advance in a storage medium in the mobile station 100, instead of being provided from the base station 200.

The configuration of the mobile station 100 and the base station 200 that transmit or receive feedback information and feedback control information described above will be described in detail in the next and subsequent sections.

2-2. Configuration Example of Mobile Station

FIG. 5 is a block diagram showing an example of the configuration of the mobile station 100 according to the present embodiment. Referring to FIG. 5, the mobile station 100 includes a wireless communication unit 110, a signal processing unit 120, an estimation unit 130, a memory 140, a selection unit 150, and a feedback controller 160.

(Wireless Communication Unit)

The wireless communication unit 110 is a communication interface for the mobile station 100 to transmit/receive a radio signal to/from the base station 200. The wireless communication unit 110 has a plurality of antennas (not shown) and an RF (Radio Frequency) circuit for MIMO communication. The wireless communication unit 110 receives, for example, a radio signal transmitted from the base station 200 via the plurality of antennas and performs amplification, a frequency conversion, and an AD (Analogue-to-Digital) conversion of the reception signal. Also, the wireless communication unit 110 performs a DA (Digital-to-Analogue) conversion, a frequency conversion, and amplification of a transmission signal and transmits the transmission signal as a radio signal to the base station 200.

Signals received by the wireless communication unit 110 include a data signal DATA, a reference signal REF, and a control signal carrying feedback control information SIG. Signals transmitted by the wireless communication unit 110 include the data signal DATA and a control signal carrying feedback information FB.

(Signal Processing Unit)

The signal processing unit 120 has a signal processing circuit to perform equalization, demodulation, and decoding of a reception signal input from the wireless communication unit 110 and to perform encoding and modulation of a transmission signal output to the wireless communication unit 110. The signal processing unit 120 performs equalization based on a transfer function of a channel estimated by the estimation unit 130. The signal processing unit 120 is connected to, for example, a processor (not shown) that realizes processing of a higher layer. Then, the signal processing unit 120 outputs data contained in the demodulated and decoded reception signal to the higher layer. Also, the signal processing unit 120 performs encoding and modulation of a transmission signal containing data input from the higher layer.

(Estimation Unit)

The estimation unit 130 estimates the channel to the base station 200 by using a reference signal received by the wireless communication unit 110 from the base station 200. For example, the estimation unit 130 estimates the transfer function H of the channel to the base station 200 by evaluating the phase of the sequence of the received reference signal and distortion of amplitude with respect to the sequence of a known signal. Then, the estimation unit 130 outputs, as a result of channel estimation, the transfer function H of the channel to the signal processing unit 120 and the selection unit 150.

(Memory)

The memory 140 is a storage medium to store data and programs used to control feedback by the mobile station 100. For example, the memory 140 stores a predetermined number of transmission weights to which indexes are attached in advance. These transmission weights are candidates of transmission weight used for down-link transmission to the mobile station 100. Also, the memory 140 stores feedback control information received by the wireless communication unit 110.

(Selection Unit)

The selection unit 150 selects the transmission weight desirable for down-link transmission on a channel to the base station 200 as the transmission weight for the above desired index in accordance with an estimation result by the estimation unit 130. Also, the selection unit 150 selects the transmission weight desirable for down-link transmission to the local apparatus on the channel and down-link transmission to another mobile station to be paired as the transmission weight for the above desired pair index in accordance with an estimation result by the estimation unit 130.

More specifically, the selection unit 150 first calculates the magnitude of received power for each candidate of the transmission weights stored in the memory 140 by using the transfer function H of the channel input from the estimation unit 130. The selection unit 150 also recognizes a number N1 of desired indexes and a number N2 of desired pair indexes to be fed back to the base station 200. Then, the selection unit 150 selects N1 transmission weights in descending order of calculated received power as the transmission weights for the desired indexes. Also, the selection unit 150 selects N2 transmission weights in ascending order of calculated received power as the transmission weights for the desired pair indexes.

The selection unit 150 can exclude transmission weights that do not satisfy the quality standard designated by feedback control information from respective selection results. That is, for example, if the number of transmission weights capable of achieving received power or SINR satisfying the designated standard is N1', which is smaller than N1, the selection unit 150 may select only N1' transmission weights as the transmission weights for the desired indexes. Also, for example, if the number of transmission weights causing interference power or SINR satisfying the designated standard is N2', which is smaller than N2, the selection unit 150 may select only N2' transmission weights as the transmission weights for the desired pair indexes. By selecting only transmission weights conforming to the predetermined quality standard for feedback as described above, the magnitude of interference caused as a result of pairing based on feedback information can be controlled to a fixed level or below.

The selection unit 150 outputs the indexes of transmission weights selected as described above to the feedback controller 160.

(Feedback Controller)

The feedback controller 160 controls feedback of transmission weights selected by the selection unit 150 to the base station 200.

More specifically, the feedback controller 160 determines the number N1 of desired indexes and the number N2 of desired pair indexes to be fed back to the base station 200 based on index number control information contained in feedback control information. Typically, N1 is an integer equal to 1 or greater. If N1 is equal to 2 or greater, indexes of two or more transmission weights satisfying the predetermined quality standard can be fed back as desired indexes N2 is an integer equal to zero or greater. If N2 is equal to 1 or greater, an index of one transmission weight or indexes of two or more transmission weights satisfying the predetermined quality standard can be fed back as a desired pair index (or desired pair indexes). These points are different from the existing Implicit Feedback method.

For example, the number N1 of desired indexes and the number N2 of desired pair indexes to be fed back may be determined in accordance with the number of active mobile stations in the cell of the base station 200. The mobile stations 100 to be counted are those mobile stations having at least MU-MIMO capabilities. If, for example, the numbers of indexes fed back per mobile station are the same, the degree of freedom of pairing (for example, the number of candidates of combination) increases with an increasing number of active mobile stations. Therefore, by decreasing the number of indexes to be fed back with an increasing number of active mobile stations, an increase in overhead can be suppressed while the degree of freedom of pairing is maintained at a fixed level or higher. When the number of active terminals is contained in feedback control information, the feedback controller 160 can determine the number of indexes (one or both of the number N1 of desired indexes and the number N2 of desired pair indexes) to be fed back in accordance with the number of active terminals. When, instead, the base station 200 determines the number of indexes to be fed back, the feedback controller 160 can recognize the number of indexes determined by the base station 200 by referring to feedback control information.

The feedback controller 160 causes the selection unit 150 to select desired indexes and desired pair indexes of the numbers determined as described above (or numbers less than the above numbers). Then, the feedback controller 160 generates feedback control information containing the selected desired indexes and desired pair indexes and transmits the generated feedback control information to the base station 200 via the wireless communication unit 110.

When a desired index selected by the selection unit 150 is contained in indexes indicated by index designation information of feedback control information, the feedback controller 160 may feed back the selected transmission weight to the base station 200. As described above, the feedback control information can indicate a desired pair index fed back from the other mobile station 100 to the base station 200. Thus, by enabling the mobile station 100 to operate in passive feedback mode in which only feedback information having the possibility of forming pairing with the other mobile station 100 is fed back, overhead can be reduced by avoiding useless signaling. In passive feedback mode, the feedback controller 160 may feed back desired indexes and desired pair indexes to the base station 200 regardless of index designation information.

2-3. Configuration Example of Base Station

Figure 6:
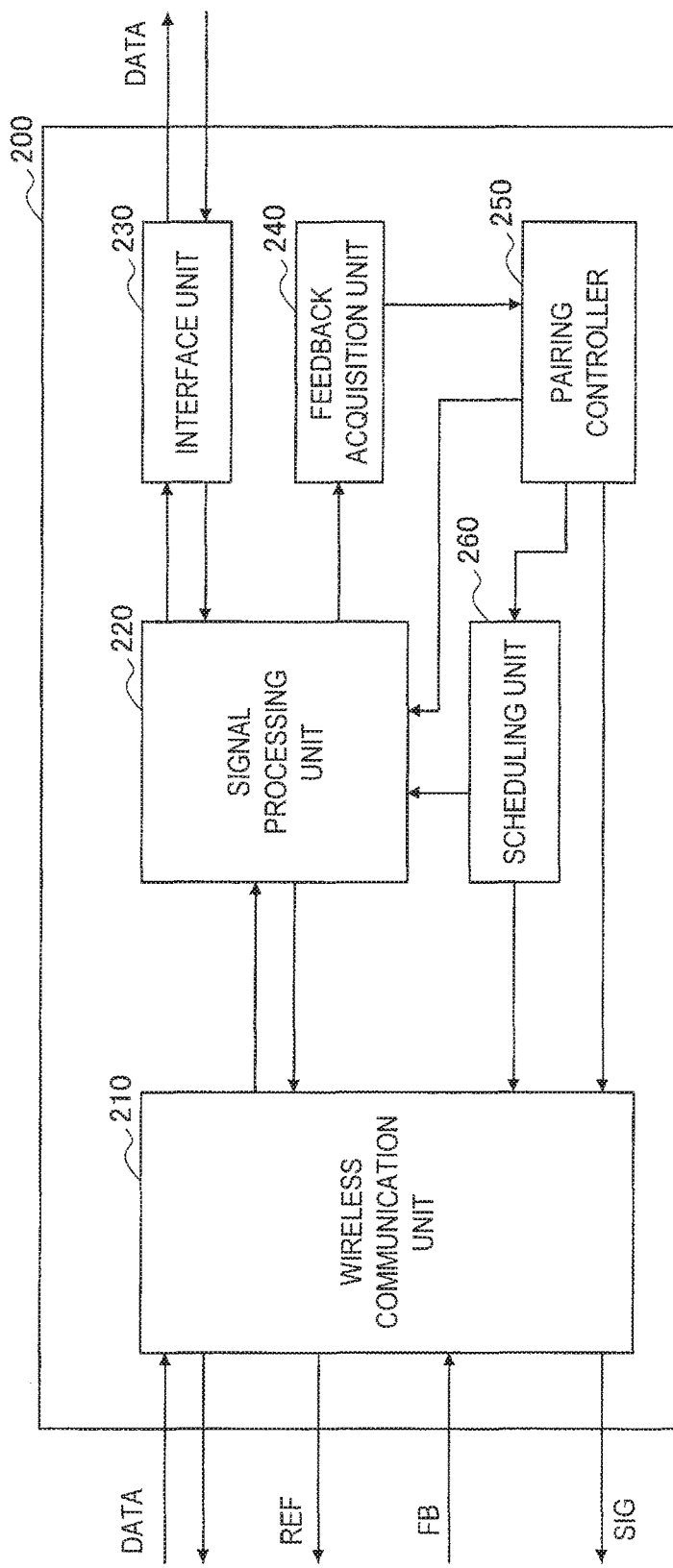
FIG. 6 is a block diagram showing an example of the configuration of a base station according to the first embodiment.

FIG. 6 is a block diagram showing an example of the configuration of the base station 200 according to the present embodiment. Referring to FIG. 6, the base station 200 includes a wireless communication unit 210, a signal processing unit 220, an interface unit 230, a feedback acquisition unit 240, a pairing controller 250, and a scheduling unit 260.

(Wireless Communication Unit)

The wireless communication unit 210 is a communication interface for the base station 200 to transmit/receive a radio signal to/from a plurality of the mobile stations 100. The wireless communication unit 210 has a plurality of antennas (not shown) and an RF circuit for MIMO communication. The wireless communication unit 210 receives, for example, an up-link signal transmitted from the mobile station 100 via the plurality of antennas and performs amplification, a frequency conversion, and an AD conversion of the reception signal. Also, the wireless communication unit 120 performs a DA conversion, a frequency conversion, and amplification of a down-link signal and transmits the down-link signal to the mobile station 100 via the plurality of antennas.

Up-link signals received by the wireless communication unit 210 include a data signal DATA and a control signal carrying feedback information FB. Down-link signals transmitted by the wireless communication unit 210 include the data signal DATA, a reference signal REF, and a control signal carrying feedback control information SIG.

(Signal Processing Unit)

The signal processing unit 220 has a signal processing circuit to perform equalization, demodulation, and decoding of a reception signal input from the wireless communication unit 210 and to perform encoding and modulation of a transmission signal output to the wireless communication unit 210. The signal processing unit 220 pre-codes a down-link signal by using a corresponding transmission weight for down-link transmission to each of the mobile stations 100. Which transmission weight to use in pre-coding for the certain mobile station 100 is determined based on feedback information from the mobile station 100. The transmission weight of the mobile station 100 to be paired in MU-MIMO can be identified as a result of pairing by the pairing controller 250. On the other hand, the transmission weight of the mobile station 100 not to be paired is the transmission weight of the first desired index fed back from the mobile station 100.

(Interface Unit)

The interface unit 230 includes a communication interface group such as an X2 interface for the base station 200 to communicate with another base station and an S1 interface for the base station 200 to communicate with a host node. The communication link between base stations is also called a back haul link. For example, a data signal transmitted/received between mobile stations belonging to different cells can be transferred via a back haul link between respective serving base stations. Each communication interface of the interface unit 230 may be a wire communication interface or a wireless communication interface.

(Feedback Acquisition Unit)

The feedback acquisition unit 240 acquires feedback information received from the mobile station 100 and decoded by the signal processing unit 220. Feedback information acquired by the feedback acquisition unit 240 contains desired indexes and desired pair indexes as exemplified in FIG. 3. Then, the feedback acquisition unit 240 outputs the acquired feedback information to the pairing controller 250.

(Pairing Controller)

The pairing controller 250 controls pairing for spatial multiplexing of a plurality of the mobile stations 100 by using feedback information acquired by the feedback acquisition unit 240. In the present embodiment, feedback information acquired by the feedback acquisition unit 240 can contain desired indexes designating two transmission weights or more. In that case, the pairing controller 250 selects the transmission weight to be used for the mobile station 100 having transmitted the feedback information from the designated two transmission weights or more. In addition, feedback information acquired by the feedback acquisition unit 240 can contain the above desired indexes. Then, the pairing controller 250 determines pairing of the mobile stations 100 in such a way that interference between down-link transmission to the plurality of the mobile stations 100 that are spatially multiplexed becomes smaller by taking feedback information from the plurality of the mobile stations 100 into consideration.

Figure 7:
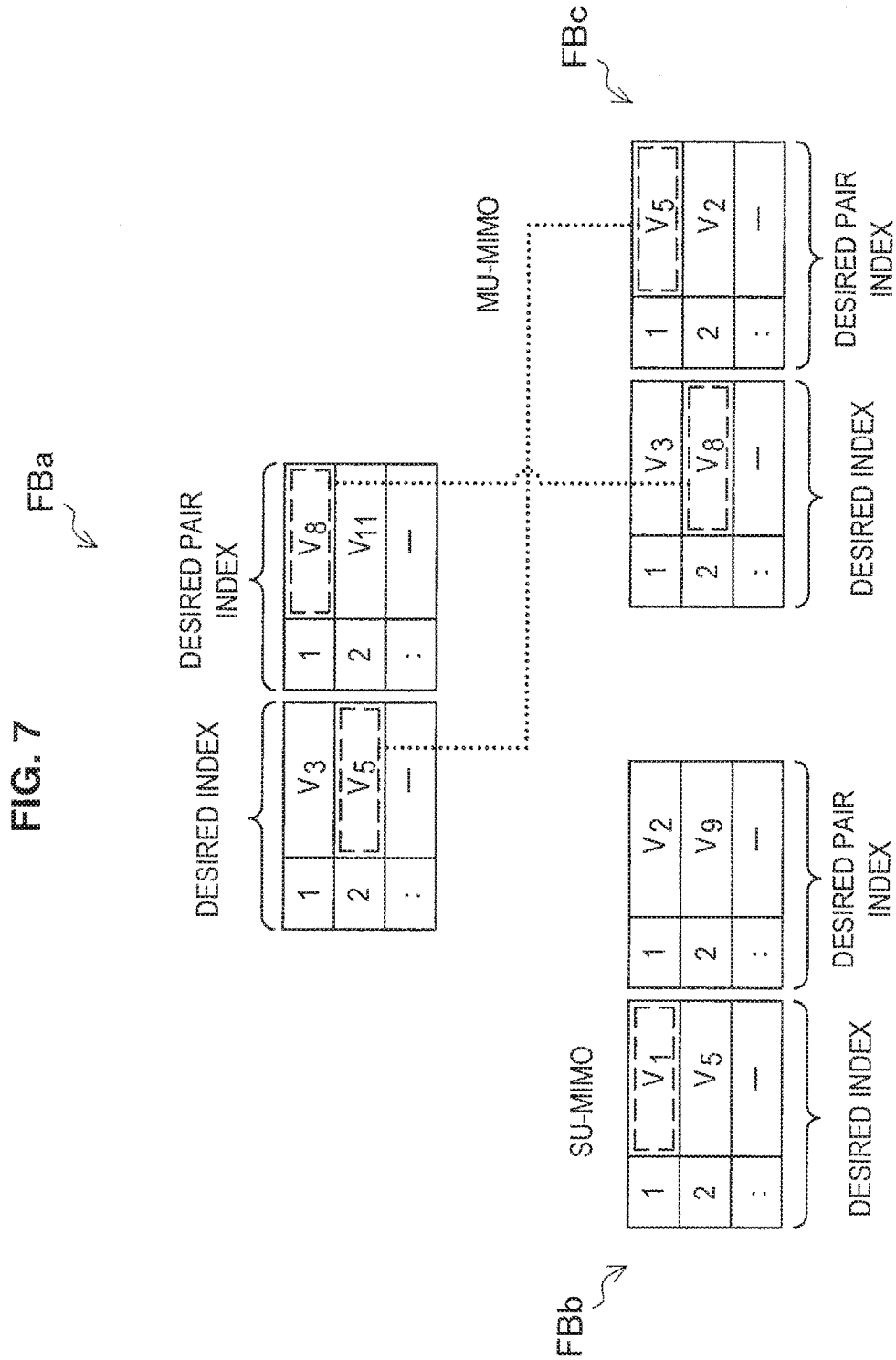
FIG. 7 is an explanatory view showing an example of pairing based on feedback information.

FIG. 7 is an explanatory view showing an example of pairing by the pairing controller 250 based on feedback information.

Referring to FIG. 7, feedback information FBa fed back from the mobile station 100a to the base station 200, feedback information FBb fed back from the mobile station 100b to the base station 200, and feedback information FBc fed back from the mobile station 100c to the base station 200 are shown. The desired index of the feedback information FBa contains $V_3$ and $V_5$ and the desired pair index contains $V_8$ and $V_{11}$. The desired index of the feedback information FBb contains $V_1$ and $V_5$ and the desired pair index contains $V_2$ and $V_9$. The desired index of the feedback information FBc contains $V_3$ and $V_8$ and the desired pair index contains $V_5$ and $V_2$.

In the example of FIG. 7, it is assumed that like in the existing Implicit Feedback method, only the first desired index is fed back from each of the mobile stations 100 to the base station 200. Then, the pairing controller 250 can select only the transmission weight $V_3$ for the mobile station 100a, the transmission weight $V_1$ for the mobile station 100b, and the transmission weight $V_3$ for the mobile station 100c. Then, because it is not allowed to pair mobile stations to which the same transmission weight is applied, selectable pairing of MU-MIMO includes only two combinations, a combination of the mobile station 100a and the mobile station 100b and a combination of the mobile station 100b and the mobile station 100c. However, even if the mobile station 100a or the mobile station 100c is combined with the mobile station 100b, interference power on the mobile station 100b caused by the transmission weight $V_3$ of the mobile station 100a or the mobile station 100c is not small (this can be understood from the fact that the transmission weight $V_3$ is not contained in the desired pair indexes of the feedback information FBb). Similarly, interference power on the mobile station 100a or the mobile station 100c caused by the transmission weight $V_1$ of the mobile station 100b is not small (this can be understood from the fact that the transmission weight $V_1$ is not contained in the desired pair indexes of the feedback information FBa, FBc). Therefore, such pairing may not be optimum for the system as a whole.

According to the present embodiment, by contrast, with a plurality of desired indexes being fed back to the base station 200, the scope for selection in pairing is extended. That is, by selecting, for example, the transmission weight $V_3$ (or $V_5$) for the mobile station 100a and the transmission weight $V_8$ (or $V_3$) for the mobile station 100c, the pairing controller 250 can pair the mobile station 100a with the mobile station 100c.

Further in the present embodiment, the pairing controller 250 can appropriately judge which transmission weight should be selected for the certain mobile station 100 to suppress interference with the other mobile stations 100. In the example of FIG. 7, $V_8$ is contained in the desired pair index of the feedback information FBa. In the desired pair index of the feedback information FBc, $V_5$ is contained. Therefore, the pairing controller 250 selects the transmission weight $V_5$ for the mobile station 100a and the transmission weight $V_8$ for the mobile station 100c to pair the mobile station 100a with the mobile station 100c. Accordingly, interference power caused when the mobile station 100a and the mobile station 100c are paired can be suppressed.

After determining pairing in this manner, the pairing controller 250 notifies the scheduling unit 260 of the determined pairing.

The pairing controller 250 also controls transmission of the feedback control information exemplified in FIG. 4 to the mobile station 100.

For example, the pairing controller 250 generates index number control information to control the number of desired indexes or desired pair indexes to be fed back from the mobile station 100 to the base station 200. The index number control information may be, for example, information representing the number of active mobile stations belonging to the base station 200. In LTE and LTE-A, the base station 200 can identify whether or not each mobile station is active by referring to the RRC (Radio Resource Control) mode of each mobile station. The RRC mode is one of "RRC_Idle" and "RRC_Connected". A mobile station whose RRC mode is "RRC_Connected" is an active mobile station. The pairing controller 250 may determine the number of indexes to be further fed back in accordance with the number of recognized active mobile stations. In that case, index number control information may represent the number itself of indexes determined by the pairing controller 250.

Also, the pairing controller 250 generates information designating the quality standard to be satisfied by transmission weights corresponding to the desired index or desired pair index. The quality standard for the desired index may be a threshold of received power or SINR. For the desired pair index, the quality standard may be a threshold of interference power or SINR. Desired indexes or desired pair indexes that do not satisfy these quality standards are excluded from feedback information by the mobile station 100.

Also, the pairing controller 250 generates index designation information designating the desired pair index fed back from a certain mobile station 100. The index designation information is broadcast into the cell of the base station 200 to search for the mobile station 100 to be the partner of pairing with the mobile station 100 having fed back the desired pair index.

(Scheduling Unit)

The scheduling unit 260 is typically a scheduler implemented in the MAC layer of the base station 200. The scheduling unit 260 schedules a plurality of the mobile stations 100 mutually paired by the pairing controller 250 in the same resource block. Down-link transmission to the plurality of the mobile stations 100 is spatially multiplexed by MU-MIMO. Also, the scheduling unit 260 schedules the mobile station 100 that is not paired in a single resource block. Down-link transmission to these mobile stations 100 is performed by SU-MIMO. Scheduling information indicating the allocation of resources determined by the scheduling unit 260 can also be broadcast into the cell of the base station 200.

2-4. Example of Flow of Processing (1) Overall Flow

FIG. 8 is a sequence diagram showing an example of the flow of feedback control processing in the cellular communication system 1 according to the present embodiment. For the purpose of simplicity of the description, only the one mobile station 100 is shown, but actually a plurality of the mobile stations 100 is involved in processing.

Referring to FIG. 8, the pairing controller 250 of the base station 200 first recognizes the number of active mobile stations belonging to the base station 200 (step S102). The number of active mobile stations recognized here may correspond to, for example, the number of the mobile stations 100 whose RRC mode is "RRC_Connected" of the mobile stations 100 positioned in the cell of the base station 200 and having capabilities of MU-MIMO.

Next, the pairing controller 250 generates feedback control information (step S104). The feedback control information generated here contains at least one of the index number control information, quality standard, and index designation information exemplified in FIG. 4.

Next, the wireless communication unit 210 of the base station 200 transmits the feedback control information generated by the pairing controller 250 to the mobile station 100 (step S112). The feedback control information may be transmitted periodically or transmitted one or several times in accordance with some trigger. In addition, the feedback control information may be broadcast, for example, on a broadcast channel or unicast or multicast to the individual mobile stations 100.

The wireless communication unit 210 of the base station 200 also transmits a reference signal to the mobile station 100 (step S114). The reference signal can typically be transmitted by using the symbol of a predetermined position in communication resources. The mobile station 100 known the position of the reference signal and can thereby receive the reference signal.

Next, the estimation unit 130 of the mobile station 100 estimates the channel to the base station 200 by using a reference signal received by the wireless communication unit 110 from the base station 200 (step S122). Then, the estimation unit 130 outputs the transfer function of the estimated channel to the selection unit 150.

Next, the selection unit 150 performs transmission weight selection processing (step S124). In the present embodiment, the selection unit 150 selects the transmission weight for the desired index and the transmission weight for the desired pair index in accordance with an estimation result by the estimation unit 130 in the transmission weight selection processing.

Next, after the transmission weights are selected by the selection unit 150, the feedback controller 160 generates feedback information (step S126). The feedback information contains the desired indexes and desired pair indexes as exemplified in FIG. 3.

Then, the wireless communication unit 110 of the mobile station 100 transmits the feedback information generated by the feedback controller 160 to the base station 200 (step S132). The feedback information is received by the wireless communication unit 210 of the base station 200 acquired by the feedback acquisition unit 240. Actually, feedback information is fed back from the plurality of the mobile stations 100 to the base station 200.

Next, the pairing controller 250 of the base station 200 determines pairing for MU-MIMO based on the acquired feedback information (step S142). As described with reference to FIG. 7, pairing is determined so that interference between down-link transmission spatially multiplexed in MU-MIMO is suppressed.

Next, the scheduling unit 260 schedules communication for each of the mobile stations 100 based on a pairing result by the pairing controller 250 (step S144).

Then, scheduling information is transmitted from the wireless communication unit 210 of the base station 200 to the mobile station 100 (step S152). By receiving the scheduling information, the mobile station 100 can know in which resource block a data signal of the down-link addressed to the local apparatus is transmitted.

Then, according to a result of scheduling by the scheduling unit 260, a data signal is transmitted from the wireless communication unit 210 of the base station 200 to each of the mobile stations 100 (step S154).

(2) Flow of Transmission Weight Selection Processing

FIG. 9 is a flow chart showing an example of a detailed flow of transmission weight selection processing by the selection unit 150 in step S124 shown in FIG. 8.

Referring to FIG. 9, the selection unit 150 first recognizes the numbers N1 and N2 of transmission weights to be fed back that can be determined by using feedback control information (step S162). N1 corresponds to the upper limit number of desired indexes to be fed back and N2 corresponds to the upper limit number of desired pair indexes to be fed back.

Next, the selection unit 150 calculates the magnitude of predicted received power for each candidate of the transmission weights (step S164). The magnitude of predicted received power can be derived from, for example, the product of a channel H estimated by the estimation unit 130 and each transmission weight $V_X$ stored in the memory 140.

Next, the selection unit 150 rearranges candidates of the transmission weights in descending order of magnitude of received power calculated in step S164 (step S166). Here, the selection unit 150 rearranges a candidate of the transmission weight of larger received power in a higher order.

Next, the selection unit 150 selects top N1 transmission weights as transmission weights desirable for down-link transmission to the local apparatus (step S168). The indexes of the transmission weights selected here are indexes included in the desired indexes.

The selection unit 150 also selects bottom N2 transmission weights as transmission weights desirable for down-link transmission to the pair (step S170). The indexes of the transmission weights selected here are indexes included in the desired pair indexes.

Next, the selection unit 150 excludes those transmission weights of the transmission weights selected in step S168 and step S170 that do not satisfy the predetermined quality standard that can be designated by feedback control information (step S172). As a result, transmission weights to be fed back from the mobile station 100 to the base station 200 are finally determined.

2-5. Summary of First Embodiment

Heretofore, the first embodiment has been described by using FIGS. 1 to 9. According to the present embodiment when two transmission weights or more are selected by the mobile station 100 in accordance with an estimation result, the selected two transmission weights or more are fed back from the mobile station 100 to the base station 200 as desired indexes. Therefore, the scope for selection in pairing for MU-MIMO by the base station 200 is extended.

Also, according to the present embodiment, transmission weights desirable for a pair mutually spatially multiplexed in MU-MIMO are fed back from the mobile station 100 to the base station 200 as desirable pair indexes. Therefore, the base station 200 can more appropriately judge which transmission weight should be selected for the certain mobile station 100 to be able to suppress interference of MU-MIMO with the pair based on the desired pair indexes. Incidentally, the base station 200 may determine pairing based on other information (for example, the index combination and the position of the mobile station 100 and so on) without desired pair indexes.

Also, according to the present embodiment, the number of transmission weights fed back from the mobile station 100 to the base station 200 is dynamically determined in accordance with the number of active mobile stations. Therefore, an increase in overhead can be suppressed while the degree of freedom of pairing is maintained at a fixed level or higher like, for example, decreasing the number of indexes to be fed back with an increasing number of active mobile stations.

Also, according to the present embodiment, the other mobile stations 100 are notified of the desired pair index fed back from the certain mobile station 100 to the base station 200 as feedback control information. Then, the mobile station 100 having received the feedback control information in passive feedback mode feeds back only feedback information having the possibility of forming pairing to the base station 200. Accordingly, useless signaling is avoided and overhead of communication is reduced.

Also, according to the present embodiment, transmission weights fed back from the mobile station 100 to the base station 200 are filtered according to whether the predetermined quality standard of down-link transmission is satisfied. Accordingly, the magnitude of interference caused as a result of pairing based on feedback information can be controlled to within an expected range.

3. Second Embodiment

3-1. System Overview

In the second embodiment described below, feedback in situations in which, in addition to MU-MIMO, CoMP is used is focused on.

(1) System Configuration Example

FIG. 10 is an explanatory view showing an overview of a cellular communication system 2 according to the second embodiment. Referring to FIG. 10, the cellular communication system 2 includes a plurality of base stations 400a to 400c and a plurality of mobile stations 300a to 300f. The base station 400a is a serving base station of the mobile stations 300a to 300c. The base station 400b is a serving base station of the mobile stations 300e and 300f.

The mobile station 300a is positioned in a region near cell edges where a cell C2 of the base station 400a and a cell C3 of the base station 400b overlap and can receive signals from the two base stations 400a, 400b. Therefore, characteristics of the mobile station 300a can be improved by utilizing Joint Processing of CoMP. FIG. 10 shows that down-link transmission Da1 from the base station 400a to the mobile station 300a and down-link transmission Da2 from the base station 400b to the mobile station 300a can be performed simultaneously by utilizing Joint Processing.

Further, the base station 400a can pair the down-link transmission Da1 to the mobile station 300a with down-link transmission Db to the mobile station 300b or down-link transmission Dc to the mobile station 300c. The base station 400b can pair the down-link transmission Da2 to the mobile station 300a with down-link transmission De to the mobile station 300e or down-link transmission Df to the mobile station 300f. Such pairing means the combined use of MU-MIMO and CoMP. When MU-MIMO and CoMP are combined for use, it is useful to further extend the feedback information described in the first embodiment as described below.

(2) Example of Feedback Information

FIG. 11 is an explanatory view showing an example of feedback information according to the present embodiment. Referring to FIG. 11, feedback information FB contains feedback FB_SRV for the serving cell and feedback FB_NBR for neighboring cells. The feedback FB_SRV for the serving cell has desired indexes and desired pair indexes. The feedback FB_NBR for neighboring cells also has desired indexes and desired pair indexes.

The feedback FB_SRV for the serving cell may be information similar to the feedback information FB according to the first embodiment exemplified in FIG. 3. In the scenario of FIG. 10, the feedback FB_SRV for the serving cell is, for example, transmitted from the mobile station 300a to the base station 400a as a serving base station to be used by the base station 400a. On the other hand, the feedback FB_NBR for neighboring cells is, for example, transmitted from the mobile station 300a to the base station 400a and further transferred from the base station 400a to the base station 400b on a back haul link. Then, the feedback FB_NBR for neighboring cells is used by the base station 400b.

Desired indexes contained in the feedback FB_NBR for neighboring cells are indexes of transmission weights desirable for down-link transmission from a base station in a neighboring cell to a mobile station (for example, the down-link transmission Da2 from the base station 400b to the mobile station 300a). That is, the desired indexes represent transmission weights desired to be used for pre-coding of down-link transmission from the serving base station and down-link transmission from neighboring base stations linked by CoMP.

Desired pair indexes contained in the feedback FB_NBR for neighboring cells are indexes of transmission weights desirable for down-link transmission to another mobile station spatially multiplexed with down-link transmission from a base station in a neighboring cell to a mobile station.

For example, transmission weights desirable for the mobile station 300*a* as the transmission weight of the down-link transmission De or the down-link transmission Df spatially multiplexed with the down-link transmission Da2 from the bAse station 400*b* to the mobile station 300*a* are indicated by the desired pair indexes of the feedback FB_NBR for neighboring cells from the mobile station 300*a*.

The desired indexes and desired pair indexes contained in the feedback FB_NBR for neighboring cells are derived by using the transfer function of the channel to a base station 400 in a neighboring cell estimated by a mobile station 300 using a reference signal from the base station 400 in the neighboring cell.

(3) Example of Feedback Control Information

FIG. 12 is an explanatory view showing an example of feedback control information according to the present embodiment. Referring to FIG. 12, feedback control information SIG as an example can contain, like in the first embodiment, three pieces of information, index number control information, a quality standard, and index designation information.

Also in the present embodiment, the index number control information may contain (1) information representing the number itself of indexes to be fed back or (2) information representing the number of active mobile stations. The above information is used to control the numbers of desired indexes and desired pair indexes for both of the feedback FB_SRV for the serving cell and the feedback FB_NBR for neighboring cells.

In the present embodiment, the index number control information may also contain (3) quality related parameters of the serving cell or (4) quality related parameters of neighboring cells. These parameters are used to control the numbers of desired indexes and desired pair indexes of the feedback FB_NBR for neighboring cells to be fed back from the mobile station 300 to the base station 400.

Quality related parameters of the serving cell are parameters related to quality of down-link transmission on a channel between the serving base station and a mobile station. The parameter may be, for example, the distance between the serving base station and the mobile station. The gain obtained for the mobile station by using CoMP increases with an increasing distance between the serving base station and the mobile station (that is, with a decreasing distance from the mobile station to a cell edge). Therefore, when the distance between the serving base station and the mobile station is large, increasing the degree of freedom of pairing by neighboring cells by increasing the number of indexes fed back to the base station of neighboring cells is useful to improve quality of CoMP. Instead of the distance between the serving base station and the mobile station, received power, SINR, or transmission delays of down-link transmission on a channel between the serving base station and the mobile station may also be used. The received power and SINR of down-link transmission can be measured by the mobile station and reported to the serving base station. The transmission delay can be measured by the serving base station as a timing advanced value. The distance between the serving base station and the mobile station may be measured by using GPS (Global Positioning System) or calculated from path losses or transmission delays.

Quality related parameters of neighboring cells are parameters related to quality of down-link transmission on a channel between a base station of a neighboring cell (hereinafter, called a neighboring base station) and a mobile station. The parameter may be, for example, the distance between the neighboring base station and the mobile station. The gain obtained for the mobile station by using CoMP increases with a decreasing distance between the neighboring base station and the mobile station. Therefore, when the distance between the neighboring base station and the mobile station is small, increasing the degree of freedom of pairing by neighboring cells by increasing the number of indexes fed back to the base station of neighboring cells is useful to improve quality of CoMP. Instead of the distance between the neighboring base station and the mobile station, received power, SINR, or transmission delays of down-link transmission on a channel between the neighboring base station and the mobile station may also be used. One of differences between quality related parameters of the serving cell and quality related parameters of neighboring cells is that quality related parameters of neighboring cells can change from neighboring cell to neighboring cell. Therefore, when quality related parameters of neighboring cells are used, the number of indexes fed back from the mobile station 300 to a first neighboring base station and the number of indexes fed back to a second neighboring base station are not necessarily the same.

The quality standard is, like in the first embodiment, information designating the standard of communication quality that should be satisfied by transmission weights corresponding to indexes to be fed back. In the present embodiment, however, the quality standard contained in the feedback FB_SRV for the serving cell and the quality standard contained in the feedback FB_NBR for neighboring cells may have mutually different standard values.

Incidentally, a portion of information exemplified in FIGS. 11 and 12 may not be contained in feedback information or feedback control information. In addition, other additional information may be contained in feedback information or feedback control information. Further, a portion of feedback control information may be stored in advance in a storage medium in the mobile station 300, instead of being provided from the base station 400.

3-2. Configuration Example of Mobile Station

FIG. 13 is a block diagram showing an example of the configuration of the mobile station 300 according to the present embodiment. Referring to FIG. 13, the mobile station 300 includes a wireless communication unit 310, the signal processing unit 120, an estimation unit 330, the memory 140, a selection unit 350, and a feedback controller 360.

(Wireless Communication Unit)

The wireless communication unit 310 is a communication interface for the mobile station 300 to transmit/receive a radio signal to/from the base station 400. The wireless communication unit 310 has a plurality of antennas (not shown) and an RF circuit for MIMO communication. The wireless communication unit 310 receives, for example, a radio signal transmitted from the base station 400 via the plurality of antennas and performs amplification, a frequency conversion, and an AD conversion of the reception signal. Also, the wireless communication unit 310 performs a DA conversion, a frequency conversion, and amplification of a transmission signal and transmits the transmission signal as a radio signal to the base station 400.

Signals received by the wireless communication unit 310 include a data signal DATA, a reference signal REF_SRV from the serving cell, a reference signal REF_NBR from neighboring cells, and a control signal carrying feedback control information SIG. Signals transmitted by the wireless communication unit 310 include the data signal DATA and a control signal carrying feedback FB_SRV for the serving cell or feedback FB_NBR for neighboring cells.

(Estimation Unit)

The estimation unit 330 estimates the channel to the serving base station by using the reference signal REF_SRV received by the wireless communication unit 310 from the serving cell. The estimation unit 330 also estimates the channel to a neighboring base station by using the reference signal REF_NBR received by the wireless communication unit 310 from a neighboring cell. Then, the estimation unit 330 outputs, as a result of channel estimation, transfer functions of the two channels to the selection unit 350.

(Selection Unit)

The selection unit 350 can select four types of transmission weights in accordance with an estimation result by the estimation unit 330. The first type of transmission weight is a transmission weight desirable for down-link transmission to the local apparatus on a channel to the serving base station. The index of the first type of transmission weight is contained in desired indexes of feedback for the serving cell. The second type of transmission weight is a transmission weight desirable for down-link transmission to another mobile station spatially multiplexed with down-link transmission from the serving base station to the local apparatus. The index of the second type of transmission weight is contained in desired pair indexes of feedback for the serving cell. The third type of transmission weight is a transmission weight desirable for down-link transmission to the local apparatus on a channel to a neighboring base station. The index of the third type of transmission weight is contained in desired indexes of feedback for neighboring cells. The fourth type of transmission weight is a transmission weight desirable for down-link transmission to another mobile station spatially multiplexed with down-link transmission from a neighboring base station to the local apparatus. The index of the fourth type of transmission weight is contained in desired pair indexes of feedback for neighboring cells.

Before selecting transmission weights, the selection unit 350 recognizes a number N1 of desired indexes and a number N2 of desired pair indexes to be fed back as feedback for the serving cell. The selection unit 350 also recognizes a number M1 of desired indexes and a number M2 of desired pair indexes to be fed back as feedback for neighboring cells. The number M1 of desired indexes and the number M2 of desired pair indexes for neighboring cells can be determined, as described above, in accordance with quality related parameters of the serving cell or quality related parameters neighboring cells in feedback control information.

Like the selection unit 150 of the mobile station 100 according to the first embodiment, the selection unit 350 may exclude transmission weights that do not satisfy the quality standard designated by feedback control information from respective selection results.

The selection unit 350 outputs the indexes of transmission weights selected as described above to the feedback controller 360.

(Feedback Controller)

The feedback controller 360 controls feedback of transmission weights selected by the selection unit 350 to the base station 400. Feedback for the serving cell is transmitted to the serving base station to be used by the serving base station. On the other hand, feedback for neighboring cells can be transmitted from the serving base station to the neighboring base station to be used by the neighboring base station.

More specifically, the feedback controller 360 first determines the upper limit numbers N1, N2, M1, M2 of indexes to be fed back to the base station 400 based on index number control information contained in feedback control information. Typically, N1 is an integer equal to 1 or greater. On the other hand, N2, M1, and M2 may be an integer equal to zero or more.

For example, the number N1 of desired indexes and the number N2 of desired pair indexes to be fed back as feedback for the serving cell may be determined in accordance with the number of active mobile stations in the serving cell. The number M1 of desired indexes and the number M2 of desired pair indexes to be fed back as feedback for neighboring cells may be determined in accordance with the number of active mobile stations in neighboring cells. By decreasing the number of indexes to be fed back with an increasing number of active mobile stations, an increase in overhead can be suppressed while the degree of freedom of pairing is maintained at a fixed level or higher.

If, for example, down-link transmission to the local apparatus is not spatially multiplexed with other down-link transmission in the serving cell (that is, in the case of SU-MIMO in the serving cell), feedback control information may indicate N1=1 and N2=0. Similarly, if down-link transmission to the local apparatus is not spatially multiplexed with other down-link transmission in a neighboring cell (that is, in the case of SU-MIMO in a neighboring cell), feedback control information may indicate M1=1 and M2=0. In these cases, an increase in overhead involved in feedback can be suppressed by applying the existing Implicit Feedback method in only the first desired index is fed back.

The feedback controller 360 causes the selection unit 350 to select four transmission weights of the numbers determined as described above (or numbers less than the above numbers). Then, the feedback controller 360 generates feedback control information containing indexes of the selected transmission weights and transmits the generated feedback control information to the base station 400 via the wireless communication unit 310.

Incidentally, when CoMP is not performed (that is, down-link transmission from the neighboring base station to the local apparatus is not performed), the feedback controller 360 may also feed back desired pair indexes for neighboring cells when it is assumed that CoMP is performed. Such feedback may be given to avoid interference between cells. That is, the above mechanism of feedback of desired pair indexes for neighboring cells for MU-MIMO and CoMP can be diverted to avoid interference between cells. When such feedback is received, a neighboring base station preferentially schedules down-link transmission to the other mobile station using the transmission weight corresponding to the desired pair index given as feedback so as to be in the same resource block as down-link transmission from the serving base station to the mobile station 300 as the feedback source. Accordingly, resources can effectively be used while interference between cells observed in the mobile station 300 of the feedback source being suppressed. In this case, feedback of desired indexes for neighboring cells may be omitted.

2-3. Configuration Example of Base Station

Figure 14:
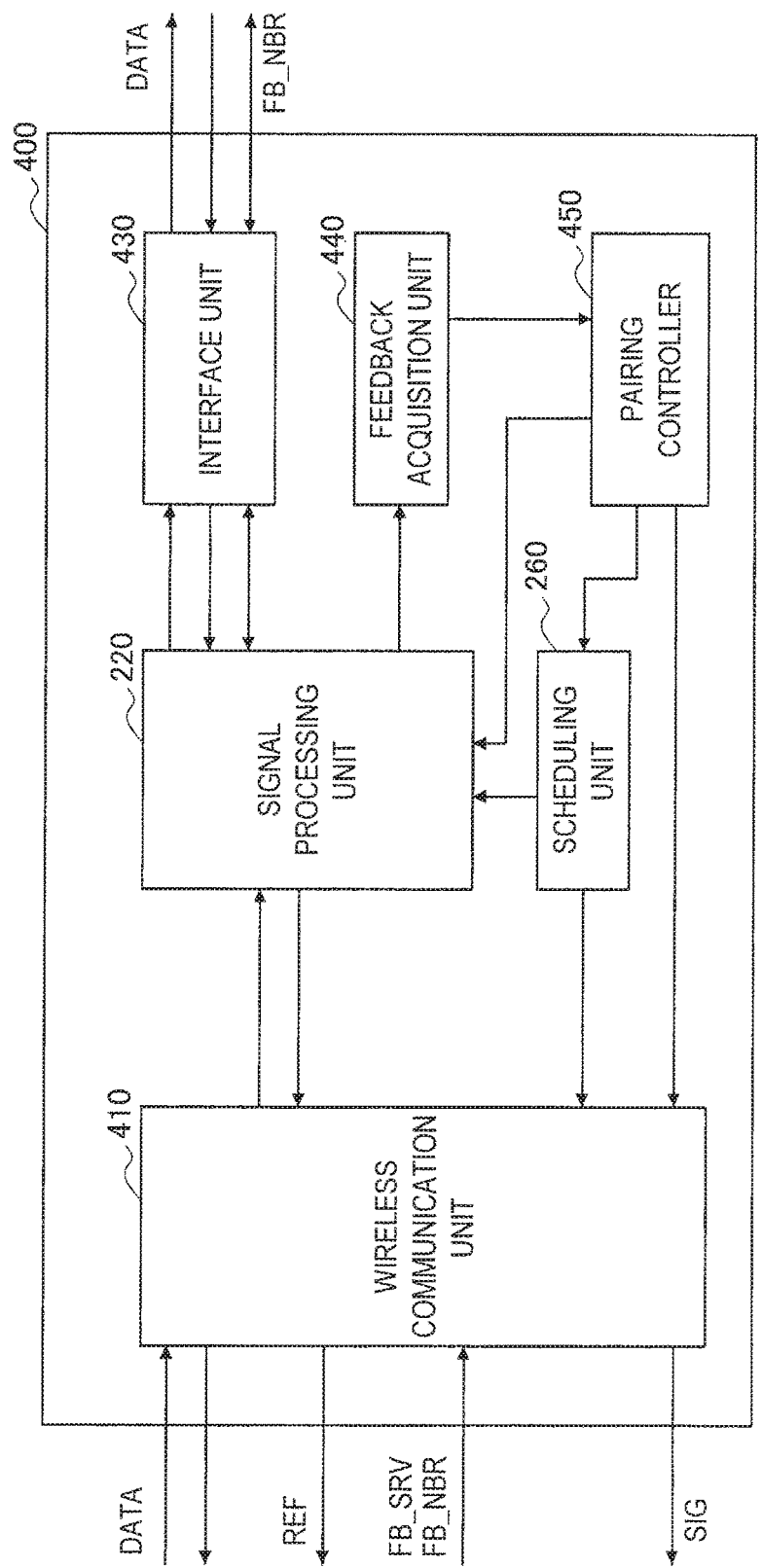
FIG. 14 is a block diagram showing an example of the configuration of a base station according to the second embodiment.

FIG. 14 is a block diagram showing an example of the configuration of the base station 400 according to the present embodiment. Referring to FIG. 14, the base station 400 includes a wireless communication unit 410, the signal processing unit 220, an interface unit 430, a feedback acquisition unit 440, a pairing controller 450, and the scheduling unit 260.

(Wireless Communication Unit)

The wireless communication unit 410 is a communication interface for the base station 400 to transmit/receive a radio signal to/from a plurality of the mobile stations 300. The wireless communication unit 410 has a plurality of antennas (not shown) and an RF circuit for MIMO communication. The wireless communication unit 410 receives, for example, an up-link signal transmitted from the mobile station 300 via the plurality of antennas and performs amplification, a frequency conversion, and an AD conversion of the reception signal. Also, the wireless communication unit 320 performs a DA conversion, a frequency conversion, and amplification of a down-link signal and transmits the down-link signal to the mobile station 300 via the plurality of antennas.

Up-link signals received by the wireless communication unit 410 include a data signal DATA and a control signal carrying feedback FB_SRV for the serving cell or feedback FB_NBR for neighboring cells. Down-link signals transmitted by the wireless communication unit 410 include the data signal DATA, a reference signal REF, and a control signal carrying feedback control information SIG.

(Interface unit)

The interface unit 430 includes a communication interface group such as an X2 interface for the base station 400 to communicate with another base station and an S1 interface for the base station 400 to communicate with a host node. For example, a data signal transmitted/received between mobile stations belonging to different cells can be transferred via a back haul link realized by and X2 interface. In addition, the feedback FB_NBR for the neighboring cell can be transmitted from the serving base station to the neighboring base station via the back haul link. Each communication interface of the interface unit 430 may be a wire communication interface or a wireless communication interface.

(Feedback Acquisition Unit)

The feedback acquisition unit 440 acquires the feedback information FB_SRV for the serving cell received from the mobile station 300 and decoded by the signal processing unit 220. The feedback acquisition unit 440 also acquires the feedback information FB_NBR for neighboring cells transferred from the other base station 400 to the local apparatus and received via the interface unit 430 (when the local apparatus is a neighboring base station). Then, the feedback acquisition unit 440 outputs the acquired feedback information to the pairing controller 450.

(Pairing Controller)

The pairing controller 450 controls pairing for spatial multiplexing of a plurality of the mobile stations 300 by using feedback information acquired by the feedback acquisition unit 440. In the present embodiment, feedback information acquired by the feedback acquisition unit 440 may contain a desired index designating one transmission weight or more desirable for down-link transmission to the mobile station 300 in a neighboring cell (the local apparatus is a neighboring base station when viewed from the mobile station 300). In that case, the pairing controller 450 selects the transmission weight to be used for down-link transmission by CoMP to the mobile station 300 from the designated one transmission weight or more. Feedback information acquired by the feedback acquisition unit 440 may also contain a desired pair index designating one transmission weight or more desirable for the other down-link transmission spatially multiplexed with down-link transmission to the mobile station 300 in a neighboring cell. The pairing controller 450 determines pairing in such a way that interference between down-link transmission to the mobile station 300 intended for CoMP and the other down-link transmission becomes smaller by taking the feedback information from the plurality of the mobile stations 100 into consideration. After determining pairing, the pairing controller 450 outputs the determined pairing to the scheduling unit 260.

The pairing controller 450 also controls transmission of the feedback control information exemplified in FIG. 12 to the mobile station 300.

For example, the pairing controller 450 generates index number control information to control the number of desired indexes or desired pair indexes to be fed back from the mobile station 300 to the base station 400. The index number control information may be, for example, information representing the number of active mobile stations belonging to the base station 400. The index number control information may be information representing the numbers of indexes N1, N2, M1, M2 determined in accordance with the number of active mobile stations. The index number control information may also be quality related parameters of the serving cell or quality related parameters of neighboring cells described above. Further, the pairing controller 450 generates information designating the quality standard to be satisfied by transmission weights corresponding to the desired index or desired pair index. Then, the pairing controller 450 transmits feedback control information containing the above information from the wireless communication unit 410 to each of the mobile stations 300.

3-4. Example of Flow of Processing (1) Overall Flow

FIGS. 15 and 16 are a sequence diagram showing an example of the flow of feedback control processing in the cellular communication system 2 according to the present embodiment. It is assumed here that the base station 400a is the serving base station of the mobile station 300 and the base station 400b is a neighboring base station. For the purpose of simplicity of the description, only the one mobile station 300 is shown, but actually a plurality of the mobile stations 300 is involved in processing. In addition, a plurality of neighboring base stations may be involved in processing.

Referring to FIG. 15, the pairing controller 450 of the base station 400a first recognizes the number of active mobile stations belonging to the base station 400a (step S202). Also, the pairing controller 450 of the base station 400b recognizes the number of active mobile stations belonging to the base station 400b (step S203). The/information recognized in step S202 and step S203 is exchanged between the base stations via a back haul link (step S204).

Next, the pairing controller 450 of the base station 400a generates feedback control information (step S206). The feedback control information generated here contains at least one of the index number control information, quality standard, and index designation information exemplified in FIG. 12.

Next, the wireless communication unit 410 of the base station 400a transmits the feedback control information generated by the pairing controller 450 to the mobile station 300 (step S212).

The wireless communication unit 410 of the base station 400a also transmits a reference signal to the mobile station 300 (step S214). Also, the wireless communication unit 410 of the base station 400b transmits a reference signal to the mobile station 300 (step S215).

Next, the estimation unit 330 of the mobile station 300 estimates the channel to the base station 400a as the serving base station by using a reference signal received from the base station 400a. The estimation unit 330 of the mobile station 300 also estimates the channel to the base station 400b as a neighboring base station by using a reference signal received from the base station 400b. (step S222). Then, the estimation unit 330 outputs the transfer functions of the estimated channels to the selection unit 350.

Next, the selection unit 350 performs transmission weight selection processing (step S224). In the present embodiment, the selection unit 350 selects transmission weights for the desired index and the desired pair index for the serving cell and transmission weights for the desired index and the desired pair index in accordance with an estimation result by the estimation unit 330 in the transmission weight selection processing.

Next, after the transmission weights are selected by the selection unit 350, the feedback controller 360 generates feedback information (step S226). The feedback information contains, as exemplified in FIG. 11, feedback FB_SRV for the serving cell and feedback FB_NBR for neighboring cells.

Then, the wireless communication unit 310 of the mobile station 300 transmits the feedback information generated by the feedback controller 360 to the base station 400a (step S232). The feedback information is received by the wireless communication unit 410 of the base station 400a. Actually, feedback information is fed back from the plurality of the mobile stations 300 to the base station 400a.

Next, referring to FIG. 16, the feedback FB_NBR for neighboring cells is transferred from the base station 400a to the base station 400b via the interface unit 430 (step S233). Accordingly, the base station 400b recognizes that CoMP intended for the mobile station 300 is requested.

Next, the pairing controller 450 of the base station 400a determines pairing in the serving cell for the mobile station 300 (step S242). Then, the scheduling unit 260 draws up a schedule based on a pairing result by the pairing controller 450 (step S244).

Similarly, the pairing controller 450 of the base station 400b determines pairing in a neighboring cell for the mobile station 300 (step S243). Then, the scheduling unit 260 draws up a schedule based on a pairing result by the pairing controller 450 (step S245).

Next, scheduling information is exchanged between the base station 400a and the base station 400b (step S250). Accordingly, Coordinated Scheduling and/or Beamforming is performed between the base station 400a and the base station 400b. In addition, data combined for transmission may be distributed between the base station 400a and the base station 400b.

Then, scheduling information is transmitted from the wireless communication unit 410 of the base station 400a to the mobile station 300 (step S252). By receiving such scheduling information, the mobile station 300 recognizes that a data signal addressed to the local apparatus is transmitted by CoMP.

Subsequently, data signals are transmitted from the wireless communication unit 410 of the base station 400a and the wireless communication unit 410 of the base station 400b to the mobile station 300 by using the same resource block (steps S254, S255).

(2) Flow of Transmission Weight Selection Processing

FIG. 17 is a flow chart showing an example of the detailed flow of transmission weight selection processing by the selection unit 350 in step S224 shown in FIG. 15.

Referring to FIG. 17, the selection unit 350 first recognizes the numbers N1, N2, M1, M2 of transmission weights to be fed back that can be determined by using feedback control information (step S262).

Next, the selection unit 350 calculates the magnitude of predicted received power for each candidate of the transmission weights of the serving cell and neighboring cells (step S264). Hereinafter, steps S266 to S272 are processing of the serving cell. In addition, steps S274 to S280 are processing of neighboring cells.

In step S266, the selection unit 350 rearranges candidates of transmission weights in descending order of magnitude of received power for the serving cell calculated in step S264 (step S266). Next, the selection unit 350 selects top N1 transmission weights as transmission weights desirable for down-link transmission from the serving base station to the local apparatus (step S268). The selection unit 350 also selects bottom N2 transmission weights as transmission weights desirable for down-link transmission from the serving base station to the pair (step S270). Next, the selection unit 350 excludes those transmission weights of the transmission weights selected in step S268 and step S270 that do not satisfy the predetermined quality standard (step S272). As a result, transmission weights to be fed back for the serving cell are finally determined.

In step S274, the selection unit 350 rearranges candidates of transmission weights in descending order of magnitude of received power for neighboring cells calculated in step S264 (step S274). Next, the selection unit 350 selects top M1 transmission weights as transmission weights desirable for down-link transmission from a neighboring base station to the local apparatus (step S276). The selection unit 350 also selects bottom M2 transmission weights as transmission weights desirable for down-link transmission from a neighboring base station to the pair (step S278). Next, the selection unit 350 excludes those transmission weights of the transmission weights selected in step S276 and step S278 that do not satisfy the predetermined quality standard (step S280). As a result, transmission weights to be fed back for the neighboring cell are finally determined.

When a plurality of neighboring base stations is involved in CoMP, processing in steps S274 to S280 may be repeated as many times as the number of neighboring base stations.

3-5. Summary of Second Embodiment

Heretofore, the second embodiment has been described by using FIGS. 10 to 17. According to the present embodiment, transmission weights selected in accordance with an estimation result of the channel to a base station in a neighboring cell are fed back from the mobile station 300 to the base station 400 as desired indexes for the neighboring cell. Therefore, when down-link transmission by CoMP is performed from a plurality of the base stations 400 to the mobile station 300, the scope for selection in pairing is extended for the base station 400 in the neighboring cell. Moreover, feedback for the neighboring cell is given via the serving base station and therefore, the implementation of the above mechanism will not be too complex when compared with the existing Implicit Feedback method.

Also, according to the present embodiment, transmission weights desirable for a pair mutually spatially multiplexed in the neighboring cell are fed back from the mobile station 300 to the base station 400 as desirable pair indexes for the neighboring cell. Therefore, the base station in the neighboring cell can more appropriately judge which transmission weight should be selected for the mobile station to be paired with the mobile station 300 intended for CoMP so as to be able to suppress interference.

Also, according to the present embodiment, the numbers of desired indexes and desired pair indexes contained in feedback for the neighboring cell can be determined in accordance with parameters related to quality of down-link transmission of the serving cell or neighboring cell. This means that the number of indexes to be fed back can be controlled in accordance with the magnitude of needs of CoMP judged from such parameters. Accordingly, an increase in overhead can be inhibited by avoiding excessive feedback.

A sequence of control processing by each apparatus described herein may be realized by using software, hardware, or a combination of software and hardware. Programs constituting software are stored in, for example, a storage medium provided inside or outside each apparatus in advance. Then, for example, each program is read into RAM (Random Access Memory) during execution and executed by a processor such as CPU (Central Processing Unit).

The preferred embodiments of the present invention have been described above with reference to the accompanying drawings, whilst the present invention is not limited to the above examples, of course. A person skilled in the art may find various alternations and modifications within the scope of the appended claims, and it should be understood that they will naturally come under the technical scope of the present invention.

REFERENCE SIGNS LIST 1,2 Cellular communication system (wireless communication system)
100,300 Mobile station (terminal apparatus)
110,310 Wireless communication unit
130,330 Estimation unit
150,350 Selection unit
160,360 Feedback controller
200,400 Base station
210,410 Wireless communication unit
240,440 Feedback acquisition unit
250,450 Pairing controller
SIG Feedback control information
FB Feedback information

The invention claimed is:

1. A communication apparatus, comprising:
a receiving circuit that receives a reference signal and feedback control information from a base station;
an estimation circuit that, using the reference signal, generates an estimation result;
a selection circuit that selects a first transmission weight which maximizes an expected received power for down-link transmission on the channel from a plurality of transmission weight candidates, and selects a second transmission weight which maximizes the expected received power from the plurality of transmission weight candidates, the expected received power of the second transmission weight being smaller than the expected received power of the first transmission weight; and
a transmitting circuit that transmits information which indicates the selected first and second transmission weights to the base station.

2. The communication apparatus according to claim 1, wherein
the selection circuit further selects a third transmission weight which minimizes a predicted interference power from the plurality of transmission weight candidates, and selects a fourth transmission weight which minimizes the predicted interference power, the predicted interference power of the fourth transmission weight being a second smallest and larger than the predicted interference power of the third transmission weight.

3. The communication apparatus according to claim 1, wherein
the transmitting circuit transmits the selected first and second transmission weights of a number determined in accordance with a number of active communication apparatuses belonging to the base station.

4. The communication apparatus according to claim 3, wherein
the transmitting circuit determines the number of the selected first and second transmission weights in accordance with the number of the active communication apparatuses belonging to the base station by using the feedback control information.

5. The communication apparatus according to claim 3, wherein
the transmitting circuit transmits the selected first and second transmission weights of the number indicated by the feedback control information to the base station.

6. The communication apparatus according to claim 1, wherein
an index designation information of the feedback control information designates transmission weights fed back from another communication apparatus to the base station, wherein
the selected first and second transmission weights are desirable for first down-link transmission spatially multiplexed on the channel with second down-link transmission from the base station to the another communication apparatus, and
when the first and second transmission weights selected by the selection circuit is in transmission weights indicated by the feedback control information, the feedback control circuit feeds back the first and second transmission weight selected by the selection circuit to the base station.

7. The communication apparatus according to claim 1, wherein
a quality standard of the feedback control information designates a predetermined standard of communication quality, and the predetermined standard of communication quality includes at least one of a threshold of received power and a threshold of SINR (Signal-to-Interference-plus-Noise Ratio), and
when the first and second transmission weights satisfying a predetermined quality standard of the down-link transmission on the channel are present, the selection circuit selects the first and second transmission weights according to the received quality standard.

8. The communication apparatus according to claim 1, wherein
the communication apparatus is provided with a wireless communication service from a first base station as a serving base station on a first channel,
the estimation circuit estimates a second channel to a second base station by using a reference signal transmitted from the second base station in a neighboring cell, the selection circuit selects a transmission weight desirable for down-link transmission on the second channel based on the estimation result by the estimation circuit, and the transmit circuit transmits the first and second transmission weight selected by the selection circuit to the second base station via the first base station.

9. The communication apparatus according to claim 8, wherein the selection circuit selects the first and second transmission weights desirable for the down-link transmission on the second channel of a number determined in accordance with parameters related to quality of down-link transmission on the first channel.

10. The communication apparatus according to claim 9, wherein the parameters include a distance between the first base station and the communication apparatus, received power of the down-link transmission on the first channel, SINR (Signal-to-Interference-plus-Noise Ratio), or a transmission delay.

11. The communication apparatus according to claim 1, wherein the selection circuit selects the first and second transmission weights desirable for the down-link transmission on the second channel of a number determined in accordance with parameters related to quality of the down-link transmission on the second channel.

12. The communication apparatus according to claim 11, wherein the parameters include a distance between the second base station and the communication apparatus, received power of the down-link transmission on the second channel, SINR (Signal-to-Interference-plus-Noise Ratio), or a transmission delay.

13. The communication apparatus according to claim 8, wherein the selection circuit selects a transmission weight of a first type desirable for down-link transmission on the first channel and a transmission weight of a second type desirable for the down-link transmission on the second channel, and when the down-link transmission on the first channel is not spatially multiplexed with other down-link transmission by the first base station, only the one transmission weight of the first type is fed back.

14. The communication apparatus according to claim 8, wherein the selection circuit selects a transmission weight of a first type desirable for down-link transmission on the first channel and a transmission weight of a second type desirable for the down-link transmission on the second channel, and when the down-link transmission on the second channel is not spatially multiplexed with other down-link transmission by the second base station, only the one transmission weight of the second type is fed back.

15. A feedback control method by a communication apparatus to control feedback to a base station, the feedback control method comprising:

receiving, by circuitry of the communication apparatus, a reference signal and feedback control information from a base station;

estimating, by the circuitry using the reference signal, a channel to the base station;

selecting, by the circuitry, a first transmission weight which maximizes an expected received power for down-link transmission on the channel from a plurality of transmission weight candidates;

selecting, by the circuitry, a second transmission weight which maximizes the expected received power from the plurality of transmission weight candidates, the expected received power of the second transmission weight being smaller than the expected received power of the first transmission weight; and transmitting, by the circuitry, information which indicates the selected first and second transmission weights to the base station.

16. A non-transitory computer readable medium storing computer executable instructions that, when executed by a communication apparatus including circuitry, cause the circuitry to:

receive a reference signal and feedback control information from a base station;

generate, using the reference signal, an estimation result by estimating a channel;

select a first transmission weight which maximizes an expected received power for down-link transmission on the channel from a plurality of transmission weight candidates, and select a second transmission weight which maximizes the expected received power from the plurality of transmission weight candidates, the expected received power of the second transmission weight being smaller than the expected received power of the first transmission weight; and transmit information which indicates the selected first and second transmission weights to the base station.

17. A base station, comprising:

a wireless communication circuit that transmits a reference signal and feedback control information to a communication apparatus;

an acquisition circuit that acquires information which indicates a first transmission weight selected by the communication apparatus, and a second transmission weight selected by the communication apparatus, the first transmission weight maximizing an expected received power for down-link transmission on a channel estimated by the communication apparatus from a plurality of transmission weight candidates and the second transmission weight maximizing the expected received power, the expected received power of the second transmission weight being smaller than the expected received power of the first transmission weight;

a pairing control circuit that controls pairing for spatial multiplexing of the communication apparatus and another communication apparatus by using the information acquired by the acquisition circuit, wherein when information about a plurality of transmission weights is acquired by the acquisition circuit from the communication apparatus, the pairing control circuit selects a transmission weight to be used for the communication apparatus from the first and second transmission weights so that interference caused when the communication apparatus is paired with the another communication apparatus becomes smaller.

18. A pairing control method by a base station to control pairing between communication apparatuses based on feedback from a communication apparatus, the paring control method comprising:

transmitting, by circuitry of the base station, a reference signal and feedback control information to a communication apparatus;

acquiring, by the circuitry, information which indicates a first transmission weight selected by the communication apparatus, and a second transmission weight selected by the communication apparatus, the first transmission weight maximizing an expected received power for down-link transmission on a channel estimated by the communication apparatus from a plurality of transmission weight candidates and the second transmission weight maximizing the expected received power, the expected received power of the second transmission weight being smaller than the expected received power of the first transmission weight;

controlling, by the circuitry, pairing for spatial multiplexing of the communication apparatus and another communication apparatus by using the information acquired by the acquisition circuit; and when information about a plurality of transmission weights is acquired by the acquisition circuit from the communication apparatus, selecting, by the circuitry, a transmission weight to be used for the communication apparatus from the first and second transmission weights so that interference caused when the communication apparatus is paired with the another communication apparatus becomes smaller.

19. A non-transitory computer readable medium storing computer executable instructions that, when executed by a base station including circuitry, cause the circuitry of the base station to:

transmit a reference signal and feedback control information to a communication apparatus;

acquire information which indicates a first transmission weight selected by the communication apparatus, and a second transmission weight selected by the communication apparatus, the first transmission weight maximizing an expected received power for down-link transmission on a channel estimated by the communication apparatus from a plurality of transmission weight candidates and the second transmission weight maximizing the expected received power, the expected received power of the second transmission weight being smaller than the expected received power of the first transmission weight;

control pairing for spatial multiplexing of the communication apparatus and another communication apparatus by using the information acquired by the acquisition circuit, wherein when information about a plurality of transmission weights is acquired by the acquisition circuit from the communication apparatus, the pairing control circuit selects a transmission weight to be used for the communication apparatus from the first and second transmission weights so that interference caused when the communication apparatus is paired with the another communication apparatus becomes smaller.

20. A wireless communication system, comprising:

a communication apparatus; and a base station, wherein the communication apparatus includes a receiving circuit that receives a reference signal and feedback control information from a base station;

an estimation circuit that, using the reference signal, generates an estimation result by estimating a channel;

a selection circuit that selects a first transmission weight which maximizes an expected received power for down-link transmission on the channel from a plurality of transmission weight candidates, and selects a second transmission weight which maximizes the expected received power from the plurality of transmission weight candidates, the expected received power of the second transmission weight being smaller than the expected received power of the first transmission weight; and a transmitting circuit that transmits information which indicates the selected first and second transmission weights to the base station, and the base station includes a wireless communication circuit that transmits a reference signal and feedback control information to a communication apparatus;

an acquisition circuit that acquires information which indicates the first transmission weight selected by the communication apparatus, and the second transmission weight selected by the communication apparatus;

a pairing control circuit that controls pairing for spatial multiplexing of the communication apparatus and another communication apparatus by using the information acquired by the acquisition circuit.

* * * * *